US011397922B2

(12) United States Patent
Zagbiv et al.

(10) Patent No.: US 11,397,922 B2
(45) Date of Patent: Jul. 26, 2022

(54) DIGITAL PROCESSING SYSTEMS AND METHODS FOR MULTI-BOARD AUTOMATION TRIGGERS IN COLLABORATIVE WORK SYSTEMS

(71) Applicant: MONDAY.COM LTD., Tel Aviv (IL)

(72) Inventors: Eliran Zagbiv, Tel Aviv (IL); Abigail Pagi, Herzliya (IL); Shanee Radzewsky, Tel Aviv (IL); Meytal Badichi, Tel Aviv (IL)

(73) Assignee: MONDAY.COM, LTD., Tel Aviv (IL)

( * ) Notice: Subject to any disclaimer, the term of this patent is extended or adjusted under 35 U.S.C. 154(b) by 0 days.

(21) Appl. No.: 17/244,121

(22) Filed: Apr. 29, 2021

(65) Prior Publication Data
US 2021/0350309 A1 Nov. 11, 2021

Related U.S. Application Data

(63) Continuation of application No. PCT/IB2021/000297, filed on Apr. 28, 2021, which is
(Continued)

(51) Int. Cl.
*G06Q 10/10* (2012.01)
*G06Q 10/06* (2012.01)
(Continued)

(52) U.S. Cl.
CPC ....... *G06Q 10/103* (2013.01); *G05B 13/0265* (2013.01); *G06F 3/0482* (2013.01);
(Continued)

(58) Field of Classification Search
USPC ........................................ 705/7.15
See application file for complete search history.

(56) References Cited

U.S. PATENT DOCUMENTS 5,479,602 A 12/1995 Baecker et al.
5,517,663 A 5/1996 Kahn
(Continued)

FOREIGN PATENT DOCUMENTS

CN 107422666 A 12/2017
CN 107623596 A 1/2018
(Continued)

OTHER PUBLICATIONS

D'Alessio et al., Monday.com Walkthrough 2018\All Features, Platforms & Thoughts, (https://www.youtube.com/watch?v=ajBtOzTlhC8&t=352s), Mar. 1, 2018, Screenshots and transcript pp. 1-55, (Year: 2018).
(Continued)

*Primary Examiner* — Muluemebet Gurmu
(74) *Attorney, Agent, or Firm* — Finnegan, Henderson, Farabow, Garrett & Dunner, LLP

(57) ABSTRACT

Systems and methods for implementing multi-table automation triggers. A system may include at least one processor configured to maintain a first table with rows and columns defining first cells; maintain a second table with rows and columns defining second cells; display a joint logical sentence structure template including a first definable condition and a second definable condition; link input options for the first definable condition to the first table; link input options for the second definable condition to the second table; generate a joint rule for the first table and the second table by storing a first value for the first definable condition and storing a second value for the second definable condition; apply the joint rule across the first table and the second table; and trigger the joint rule when the first condition in the first table is met and the second condition in the second table is met.

16 Claims, 9 Drawing Sheets

Related U.S. Application Data a continuation-in-part of application No. PCT/IB2021/000090, filed on Feb. 11, 2021, and a continuation-in-part of application No. PCT/IB2021/000024, filed on Jan. 14, 2021, and a continuation-in-part of application No. PCT/IB2020/000974, filed on Nov. 17, 2020, and a continuation-in-part of application No. PCT/IB2020/000658, filed on Aug. 7, 2020.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.

| | | |
|---|---|---|
| *G06F 16/14* | (2019.01) | |
| *G06F 16/23* | (2019.01) | |
| *G06F 16/25* | (2019.01) | |
| *G06F 16/11* | (2019.01) | |
| *H04L 67/1095* | (2022.01) | |
| *G06F 3/0482* | (2013.01) | |
| *G06F 3/14* | (2006.01) | |
| *H04L 51/046* | (2022.01) | |
| *H04L 51/04* | (2022.01) | |
| *G06F 40/279* | (2020.01) | |
| *G06F 40/40* | (2020.01) | |
| *G06F 40/30* | (2020.01) | |
| *G06K 9/62* | (2022.01) | |
| *G06F 3/04817* | (2022.01) | |
| *G06F 3/16* | (2006.01) | |
| *H04L 12/18* | (2006.01) | |
| *G06F 16/22* | (2019.01) | |
| *G06F 16/2455* | (2019.01) | |
| *G06F 16/248* | (2019.01) | |
| *G06F 40/177* | (2020.01) | |
| *H04L 65/401* | (2022.01) | |
| *G06N 20/00* | (2019.01) | |
| *G06F 40/186* | (2020.01) | |
| *G06F 3/0484* | (2022.01) | |
| *G06F 11/30* | (2006.01) | |
| *G06F 11/34* | (2006.01) | |
| *G06F 40/103* | (2020.01) | |
| *G06F 3/04845* | (2022.01) | |
| *G06T 11/20* | (2006.01) | |
| *G06F 16/909* | (2019.01) | |
| *G06F 16/9038* | (2019.01) | |
| *G06F 16/9032* | (2019.01) | |
| *G06F 16/901* | (2019.01) | |
| *G06F 16/951* | (2019.01) | |
| *G06F 16/9536* | (2019.01) | |
| *G06F 16/28* | (2019.01) | |
| *G06F 16/26* | (2019.01) | |
| *G06F 40/253* | (2020.01) | |
| *H04L 51/18* | (2022.01) | |
| *H04L 51/48* | (2022.01) | |
| *G06F 16/903* | (2019.01) | |
| *G05B 13/02* | (2006.01) | |
| *G06F 16/31* | (2019.01) | |
| *G06F 40/106* | (2020.01) | |
| *G06F 9/54* | (2006.01) | |
| *B65D 83/04* | (2006.01) | |

(52) U.S. Cl.
CPC ........ *G06F 3/0484* (2013.01); *G06F 3/04817* (2013.01); *G06F 3/04845* (2013.01); *G06F 3/1454* (2013.01); *G06F 3/165* (2013.01); *G06F 9/542* (2013.01); *G06F 9/548* (2013.01); *G06F 11/302* (2013.01); *G06F 11/3409* (2013.01); *G06F 11/3438* (2013.01); *G06F 16/116* (2019.01); *G06F 16/144* (2019.01); *G06F 16/2282* (2019.01); *G06F 16/23* (2019.01); *G06F 16/2308* (2019.01); *G06F 16/2365* (2019.01); *G06F 16/2393* (2019.01); *G06F 16/248* (2019.01); *G06F 16/2456* (2019.01); *G06F 16/24564* (2019.01); *G06F 16/24565* (2019.01); *G06F 16/258* (2019.01); *G06F 16/26* (2019.01); *G06F 16/287* (2019.01); *G06F 16/328* (2019.01); *G06F 16/909* (2019.01); *G06F 16/9017* (2019.01); *G06F 16/9038* (2019.01); *G06F 16/90328* (2019.01); *G06F 16/90344* (2019.01); *G06F 16/951* (2019.01); *G06F 16/9536* (2019.01); *G06F 40/103* (2020.01); *G06F 40/106* (2020.01); *G06F 40/177* (2020.01); *G06F 40/186* (2020.01); *G06F 40/253* (2020.01); *G06F 40/279* (2020.01); *G06F 40/30* (2020.01); *G06F 40/40* (2020.01); *G06K 9/6215* (2013.01); *G06N 20/00* (2019.01); *G06Q 10/0633* (2013.01); *G06Q 10/06312* (2013.01); *G06Q 10/06313* (2013.01); *G06Q 10/06316* (2013.01); *G06Q 10/063114* (2013.01); *G06Q 10/063118* (2013.01); *G06Q 10/101* (2013.01); *G06T 11/206* (2013.01); *H04L 12/1827* (2013.01); *H04L 51/04* (2013.01); *H04L 51/046* (2013.01); *H04L 51/18* (2013.01); *H04L 51/28* (2013.01); *H04L 65/4015* (2013.01); *H04L 67/1095* (2013.01); *B65D 83/0409* (2013.01); *G06F 2201/865* (2013.01); *G06F 2201/88* (2013.01); *G06F 2203/04803* (2013.01); *G06T 2200/24* (2013.01)

(56) References Cited

U.S. PATENT DOCUMENTS

| | | |
|---|---|---|
| 5,682,469 A | 10/1997 | Linnett |
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,553 A | 1/2000 | Schneider et al. |
| 6,023,695 A | 2/2000 | Osborn et al. |
| 6,167,405 A | 12/2000 | Rosensteel, Jr. et al. |
| 6,169,534 B1 | 1/2001 | Raffel et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,522,347 B1 | 2/2003 | Tsuji et al. |
| 6,527,556 B1 | 3/2003 | Koskinen |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 7,027,997 B1 | 4/2006 | Robinson et al. |
| 7,043,529 B1 | 5/2006 | Simonoff |

(56) References Cited

U.S. PATENT DOCUMENTS

| | | |
|---|---|---|
| 7,054,891 B2 | 5/2006 | Cole |
| 7,237,188 B1* | 6/2007 | Leung ................. G06F 40/103 715/209 |
| 7,249,042 B1 | 7/2007 | Doerr et al. |
| 7,272,637 B1 | 9/2007 | Himmelstein |
| 7,379,934 B1 | 5/2008 | Forman et al. |
| 7,383,320 B1 | 6/2008 | Silberstein et al. |
| 7,415,664 B2 | 8/2008 | Aureglia et al. |
| 7,461,077 B1 | 12/2008 | Greenwood |
| 7,489,976 B2 | 2/2009 | Adra |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,916,157 B1 | 3/2011 | Kelley et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,423,909 B2 | 4/2013 | Zabielski |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,129,234 B2 | 9/2015 | Campbell et al. |
| 9,172,738 B1 | 10/2015 | daCosta |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,798,829 B1 | 10/2017 | Baisley |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,445,702 B1 | 10/2019 | Hunt |
| 10,452,360 B1 | 10/2019 | Burman et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,564,622 B1 | 2/2020 | Dean et al. |
| 10,573,407 B2 | 2/2020 | Ginsburg |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1* | 12/2004 | Brid ................. G06F 40/183 715/220 |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |

(56) References Cited

U.S. PATENT DOCUMENTS

| | | |
|---|---|---|
| 2006/0009960 A1* | 1/2006 | Valencot .............. G06F 16/217 703/22 |
| 2006/0015806 A1 | 1/2006 | Wallace |
| 2006/0031148 A1 | 2/2006 | O'Dell et al. |
| 2006/0047811 A1 | 3/2006 | Lau et al. |
| 2006/0053096 A1* | 3/2006 | Subramanian ...... G06F 16/2428 |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0190313 A1 | 8/2006 | Lu |
| 2006/0224542 A1* | 10/2006 | Yalamanchi .............. G06N 5/04 706/47 |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2006/0294451 A1 | 12/2006 | Kelkar et al. |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034314 A1 | 2/2008 | Louch et al. |
| 2008/0065460 A1 | 3/2008 | Raynor |
| 2008/0077530 A1 | 3/2008 | Banas et al. |
| 2008/0104091 A1 | 5/2008 | Chin |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287221 A1 | 11/2010 | Battepati et al. |
| 2010/0324964 A1 | 12/2010 | Callanan et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0079408 A1 | 3/2012 | Rohwer |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0239454 A1 | 9/2012 | Taix et al. |
| 2012/0246170 A1 | 9/2012 | Iantorno |
| 2012/0254252 A1 | 10/2012 | Jin et al. |

(56) References Cited

U.S. PATENT DOCUMENTS

| | | |
|---|---|---|
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2014/0006326 A1 | 1/2014 | Bazanov |
| 2014/0019842 A1 | 1/2014 | Montagna et al. |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0108985 A1 | 4/2014 | Scott et al. |
| 2014/0109012 A1 | 4/2014 | Choudhary et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137144 A1 | 5/2014 | Järvenpää et al. |
| 2014/0173401 A1 | 6/2014 | Oshlag et al. |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142829 A1 | 5/2015 | Lee et al. |
| 2015/0153943 A1 | 6/2015 | Wang |
| 2015/0169531 A1 | 6/2015 | Campbell et al. |
| 2015/0212717 A1 | 7/2015 | Nair et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0246490 A1 | 8/2016 | Cabral |
| 2016/0253982 A1 | 9/2016 | Cheung et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1 | 12/2016 | Ritchie et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0063722 A1 | 3/2017 | Cropper et al. |
| 2017/0075557 A1 | 3/2017 | Noble et al. |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0126772 A1 | 5/2017 | Campbell et al. |
| 2017/0132296 A1 | 5/2017 | Ding |
| 2017/0139874 A1 | 5/2017 | Chin |
| 2017/0139884 A1 | 5/2017 | Bendig et al. |
| 2017/0153771 A1 | 6/2017 | Chu |
| 2017/0177888 A1 | 6/2017 | Arora et al. |
| 2017/0185668 A1 | 6/2017 | Convertino et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0351252 A1 | 12/2017 | Kleifges et al. |
| 2017/0372442 A1 | 12/2017 | Mejias |
| 2018/0025084 A1 | 1/2018 | Conlan et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0157455 A1 | 6/2018 | Troy et al. |

(56) References Cited

U.S. PATENT DOCUMENTS

| | | |
|---|---|---|
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0357305 A1 | 12/2018 | Kinast et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0036989 A1 | 1/2019 | Eirinberg et al. |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0026397 A1 | 1/2020 | Wohlstadter et al. |
| 2020/0042648 A1 | 2/2020 | Rao |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0247661 A1 | 8/2020 | Rao et al. |
| 2020/0279315 A1 | 9/2020 | Manggala |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0084120 A1 | 3/2021 | Fisher et al. |
| 2021/0124872 A1 | 4/2021 | Lereya |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0264220 A1 | 8/2021 | Wei et al. |

FOREIGN PATENT DOCUMENTS

| | | |
|---|---|---|
| CN | 107885656 A | 4/2018 |
| CN | 112929172 A | 6/2021 |
| WO | WO 2004/100015 A2 | 11/2004 |
| WO | WO 2006/116580 A2 | 11/2006 |
| WO | WO 2017202159 A1 | 11/2017 |
| WO | WO 2020/187408 A1 | 9/2020 |

OTHER PUBLICATIONS

Rodrigo et al., Project Management with Monday.com: a 101 Introduction; Jul. 22, 2019, pp. 1-21, 2019.
International Search Report and Written Opinion of the International Searching Authority in PCT/IB2020/000658, dated Nov. 11, 2020 (12 pages).
International Search Report in PCT/IB2020/000974, dated May 3, 2021 (19 pages).
International Search Report in PCT/IB2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/IB2021/000024, dated May 3, 2021 (13 pages).
"Pivot table—Wikipedia"; URL: https://en.wikepedia .org/w/index. php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2010, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).
U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.

(56) References Cited

OTHER PUBLICATIONS

U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
International Search Report and Written Opinion of the International Search Authority in PCT/IB2021/000297, dated Oct. 12, 2021 (20 pages).
Dapulse.com "features".extracted from web.archive.or/web/2014091818421/https://dapulse.com/features; Sep. 2014 (Year: 2014).
Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).
Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).
Sajjad Bahrebar et al., "A Novel Type-2 Fuzzy Logic for Improved Risk Analysis of Proton Exchange Membrane Fuel Cells in Marine Power Systems Application", *Energies*, 11, 721, pp. 1-16, Mar. 22, 2018.

\* cited by examiner

FIG. 3

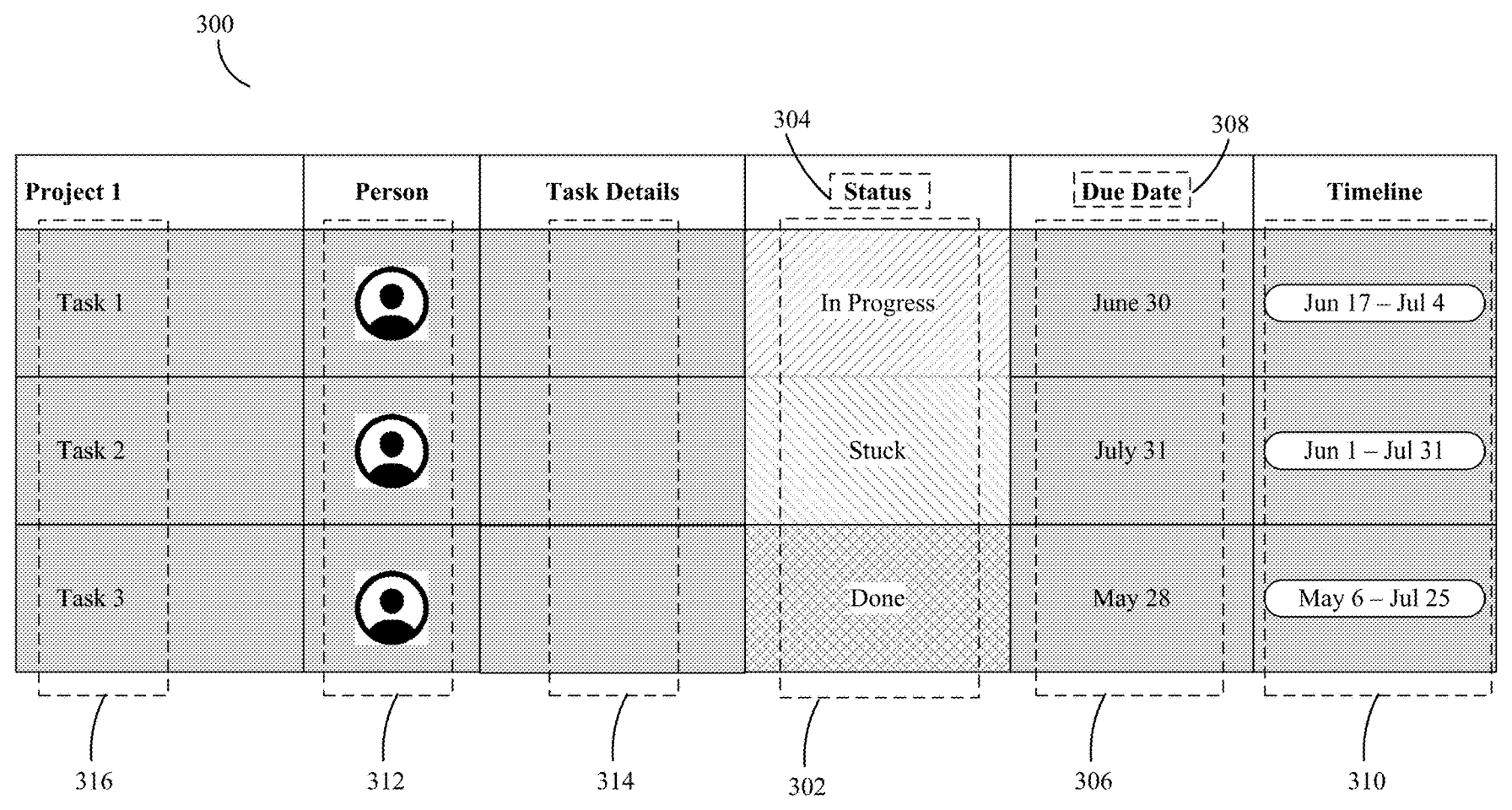

| Project 1 | Person | Task Details | Status | Due Date | Timeline |
|---|---|---|---|---|---|
| Task 1 | | | In Progress | June 30 | Jun 17 – Jul 4 |
| Task 2 | | | Stuck | July 31 | Jun 1 – Jul 31 |
| Task 3 | | | Done | May 28 | May 6 – Jul 25 |

DIGITAL PROCESSING SYSTEMS AND METHODS FOR MULTI-BOARD AUTOMATION TRIGGERS IN COLLABORATIVE WORK SYSTEMS

CROSS-REFERENCE TO RELATED APPLICATIONS

This application is based on and claims benefit of priority of U.S. Nonprovisional patent application Ser. No. 17/242,452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

Some embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Systems, methods, and computer readable media for implementing multi-table automation triggers are disclosed. They may include at least one processor that is configured to maintain a first table with rows and columns defining first cells, maintain a second table with rows and columns defining second cells, and display a joint logical sentence structure template including a first definable condition and a second definable condition. Input options for the first definable condition may be linked to the first table, input options for the second definable condition may be linked to the second table, and a joint rule may be generated for the first table and the second table by storing a first value for the first definable condition and storing a second value for the second definable condition. The joint rule may be applied across the first table and the second table and triggered when the first condition in the first table is met and the second condition in the second table is met.

Some embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Methods, computer readable media and systems employing self-configuring table automations are disclosed. Systems, methods, devices, and non-transitory computer readable media may include at least one processor that is configured to present a plurality of alternative automation packages for application to a table, wherein each package includes a plurality of automations, and wherein each automation is configured to cause an action in response to at least one condition detected in the table. A selection of a package from the plurality of packages may be identified, a first condition may be automatically configured in a particular automation in the selected package based on data in the table, a second undefined condition of the particular automation may be displayed, wherein the second undefined condition may require further configuration. An input may be received for configuring the second undefined condition, the second undefined condition may be configured using the input to cause the second undefined condition to become a second defined condition, and the particular automation may be applied to the table.

BRIEF DESCRIPTION OF THE DRAWINGS

FIG. 3 illustrates an example of a table that includes multiple columns and rows, consistent with some embodiments of the present disclosure.

DETAILED DESCRIPTION

Figure 1:
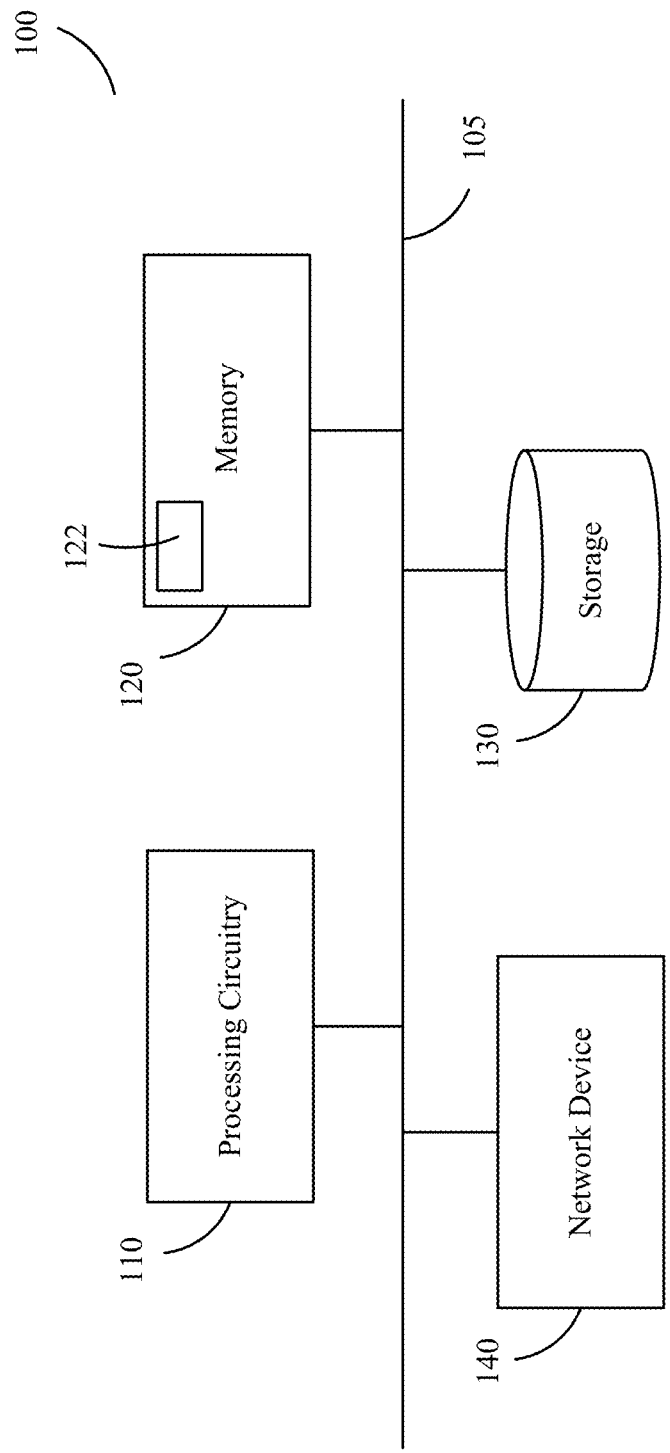
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit.

Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
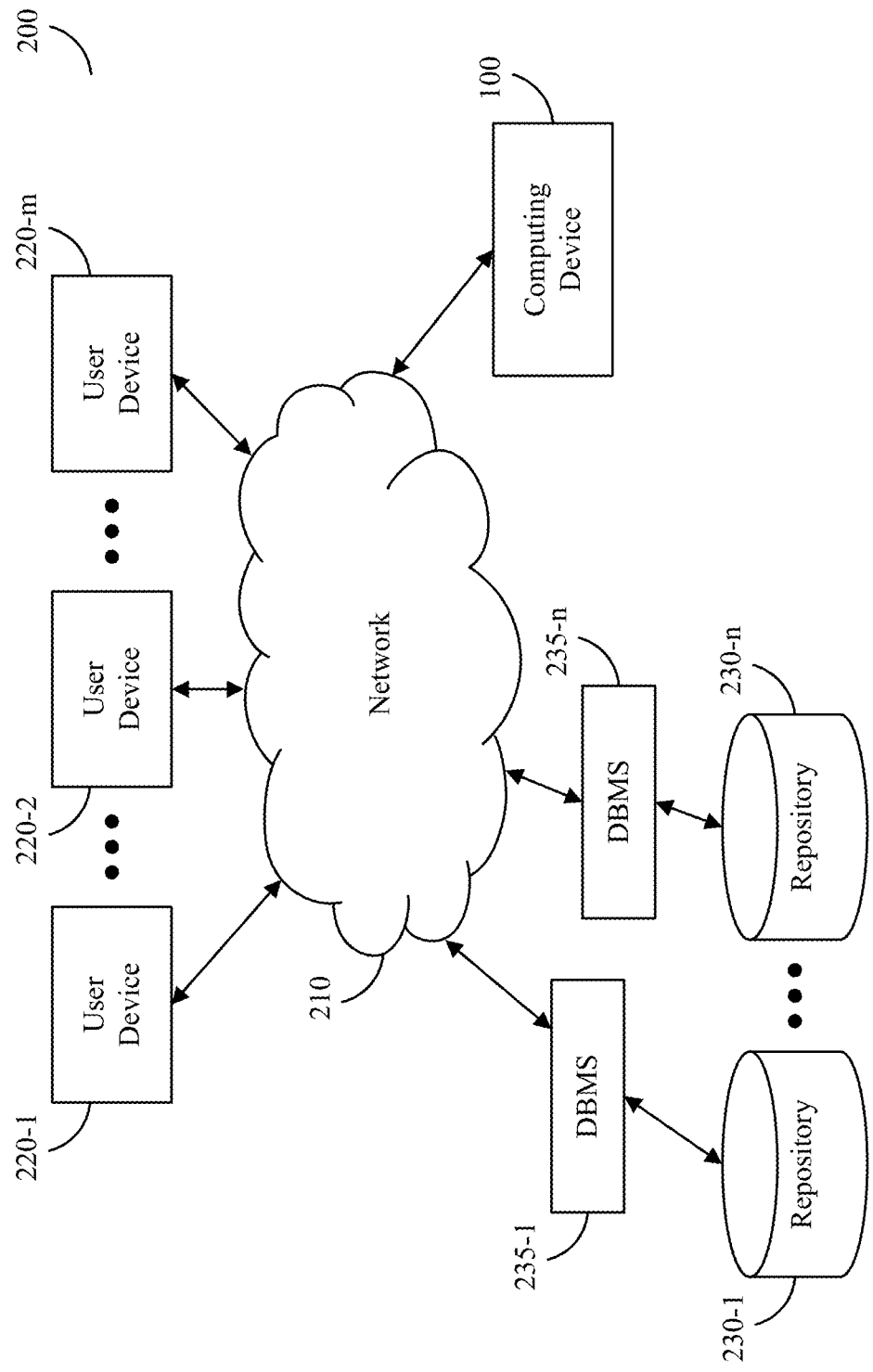
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Aspects of this disclosure may provide a technical solution to the challenging technical problem of project management of multiple entities on collaborative networks and may relate to a system for implementing multi-table automation triggers, including methods, systems, devices, and computer-readable media. For ease of discussion, some examples are described below with reference to methods, systems, devices, and/or computer-readable media, with the understanding that discussions of each apply equally to the others. For example, some aspects of methods may be implemented by a computing device or software running thereon. The computing device may include at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Some disclosed embodiments may involve at least one processor configured to maintain datasets or tables, display logical sentence structure templates, link input options for definable conditions of a logical sentence structure to corresponding tables, generate rules, store input values, apply the generated rules, and implement and trigger the rules based on the conditions being met, among other functions.

An automation, also referred to as a logical sentence structure template may refer to a logical rule with one or more logical connectors, and configured to act on table data to produce an outcome. An automation may also be considered as a "recipe" having a logical organization of elements for implementing a conditional action.

The automation, for example, may be in the form of a recipe, a template, or a sentence including one or more triggering elements (also referred to herein as "triggers") and one or more action elements (also referred to herein as "actions" hereinafter). An automation may be configured to cause an action in response to a trigger, such as an event or a condition, the occurrence or satisfaction of which may cause another event in the system, implemented by the automation. Triggers may occur as the result of one or more conditions in a single table or across multiple tables. Triggers further may also occur as the result of conditions being met across multiple tables and/or across multiple users or entities. An action of an automation may refer to a change of one or more components of the system. For example, the change may include addition, deletion, alteration, conversion, rearrangement, or any manner of manipulation of data stored in the system. As an example, in an automation or a logical sentence structure template such as "when a task is done, notify John," notifying John may correspond to the action performed in response to the automation trigger or condition being met, i.e. task being done, and the logical connector "when.". Automations may be broadly referred to as rules. In some embodiments, the rules may include a mathematical function, a conditional function, computer-readable instructions, or other executable functions.

Aspects of this disclosure may involve maintaining a first table with rows and columns defining first cells and maintaining a second table with rows and columns defining second cells. A table includes those items described herein in connection with the term "tablature," and may include horizontal and vertical rows for presenting, displaying, or enabling access to information stored therein. A table may be presented on a screen associated with a computing device or via any electronic device that displays or projects information on a surface or virtually. An intersection of multiple rows may represent a cell. For example, a cell may be represented as an intersection of a horizontal row (or referred to as a "horizontal column") and a vertical row (or referred to as a "vertical column"). A cell may contain a value, a color, a word, a graphic, a symbol, a GIF, a meme, any combination thereof, or any other data. In some embodiments, a table may be presented in two dimensions, three dimensions, or more. A table, a board, a workboard, a dashboard, or a part thereof, including digital data (e.g., computer readable data) may be populated via a data structure.

A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure does not require information to be co-located. It may be distributed across multiple servers, for example, that may be owned or operated by the same or different entities. Thus, the term "data structure" in the singular is inclusive of plural data structures.

Maintaining a table may refer to one or more of storing information that may be used to populate a table, storing a table template that may be populated by data, or storing a link that associates stored data with a table form or template. For example, a system may store an object or the link to an object in a non-transitory computer-readable medium. In some embodiments, maintaining a table may include storing a form of table with vertical and/or horizontal row headers defining information to be contained in cells of such rows. Maintaining a table may also include storing values associated with the cells of such rows. In some embodiments, maintaining a table may include one or more of saving, storing, recording, updating, tracking, counting, editing, viewing, displaying, aggregating, combining, or otherwise retaining in a repository information for representation in a table.

By way of example with reference to FIGS. 1-2, a system may maintain a table by storage in memory 120, in storage 130, in repository 230-1 (FIG. 2), or any combination thereof. FIG. 3 illustrates an exemplary table 300 that may include multiple columns and rows, consistent with some embodiments of the present disclosure. In some embodiments, the table 300 may be displayed using a computing device (e.g., the computing device 100 illustrated in FIG. 1) or software running thereon. The table 300 may be associated with a project (e.g., "Project 1" in FIG. 3) and may include, in the multiple rows and columns, tasks (e.g., in rows including "Task 1," Task 2," or "Task 3") included in the project, persons (e.g., in a column 312) assigned to the tasks, details (e.g., in a column 314) of the tasks, statuses (e.g., in a column 302) of the tasks, due dates (e.g., in a column 306) of the tasks, timelines (e.g., in a column 310) of the tasks, or any information, characteristic, or associated entity of the project. A task may refer to a part or a portion of a project. A task may be performed by an entity (e.g., an individual or a team). In some embodiments, a task may be represented by a row of cells in a task table. In some embodiments, a task may be represented by a column of cells of a task table. An entity may refer to an individual, a team, a group, a department, a division, a subsidiary, a company, a contractor, an agent or representative, or any independent, distinct organization (e.g., a business or a government unit) that has an identity separate from those of its members, or a combination thereof.

As illustrated in FIG. 3, the at least one processor may maintain a plurality of tables (e.g., including the table 300) and other information (e.g., metadata) associated with the plurality of tables. Each table (e.g., the table 300) of the plurality of tables may include a plurality of rows (e.g., the rows of "Task 1," Task 2," and "Task 3" in the table 300) and columns (e.g., columns 302, 306, 310, 312, 314, and 316 of the table 300).

As mentioned previously, consistent with some disclosed embodiments, at least one processor may be configured to maintain a second table with rows and columns defining second cells. A second table may include a sub-table of the first table, a sub-table of another table, a separate table associated with the same project as the first table, a separate table associated with a different project from the project of the first table, a table associated with a same project of a same entity, a table associated with a different project of the same entity, a table associated with a same project of different entity (e.g., a second user or a teammate), or any other combinations and permutations thereof. A second table may include tables as previously described above, including horizontal and vertical rows for presenting, displaying, or enabling access to information stored therein.

A relationship between the first and the second table may be hierarchical. A hierarchical relationship, as used in the context of this disclosure, may refer to a relationship based on degrees or levels of superordination and subordination. For example, in some embodiments, the first table may be a table associated with a task or a project and the second table may be a sub-table of the first table associated with the same project or a different project. In such a scenario, the first table may be considered a superordinate table and the second table may be considered a subordinate table.

Other examples of hierarchical relationships between a first and a second table are described herein. In some embodiments, an entity may be associated with one or more projects, and the first table may be a table associated with a first project of the entity, and the second table may be a table associated with a second project of the entity. In such a case, the first table may be the superordinate table and the second table may be the subordinate table. Alternatively, the first table may be the subordinate table and the second table may be the superordinate table. In some embodiments, the first table and the second table may be tables or sub-tables associated with different entities, different projects of a same entity, different projects of different entities, or other combinations thereof.

In some disclosed embodiments, the first and the second tables may be associated with or may be a part of a workflow. A workflow may refer to a series of operations or tasks performed sequentially or in parallel to achieve an outcome. A workflow process may involve managing information stored in tables associated with one or more entities, one or more projects within an entity, or projects across multiple entities. In an exemplary workflow process, a freelancer may create an invoice and send it to a client, the client may forward the invoice to the finance department, the finance department may approve the invoice and process the payment, the customer relations department may pay the freelancer. Similarly, the workflow process may involve sending a notification from the freelancer to the client in response to a status of the invoice being "Done," mirroring the received invoice to the finance department, updating a status (e.g., not yet paid, in process, approved, and so on) of the invoice processing, and updating a status in response to payment transmitted to the freelancer.

Figure 4:
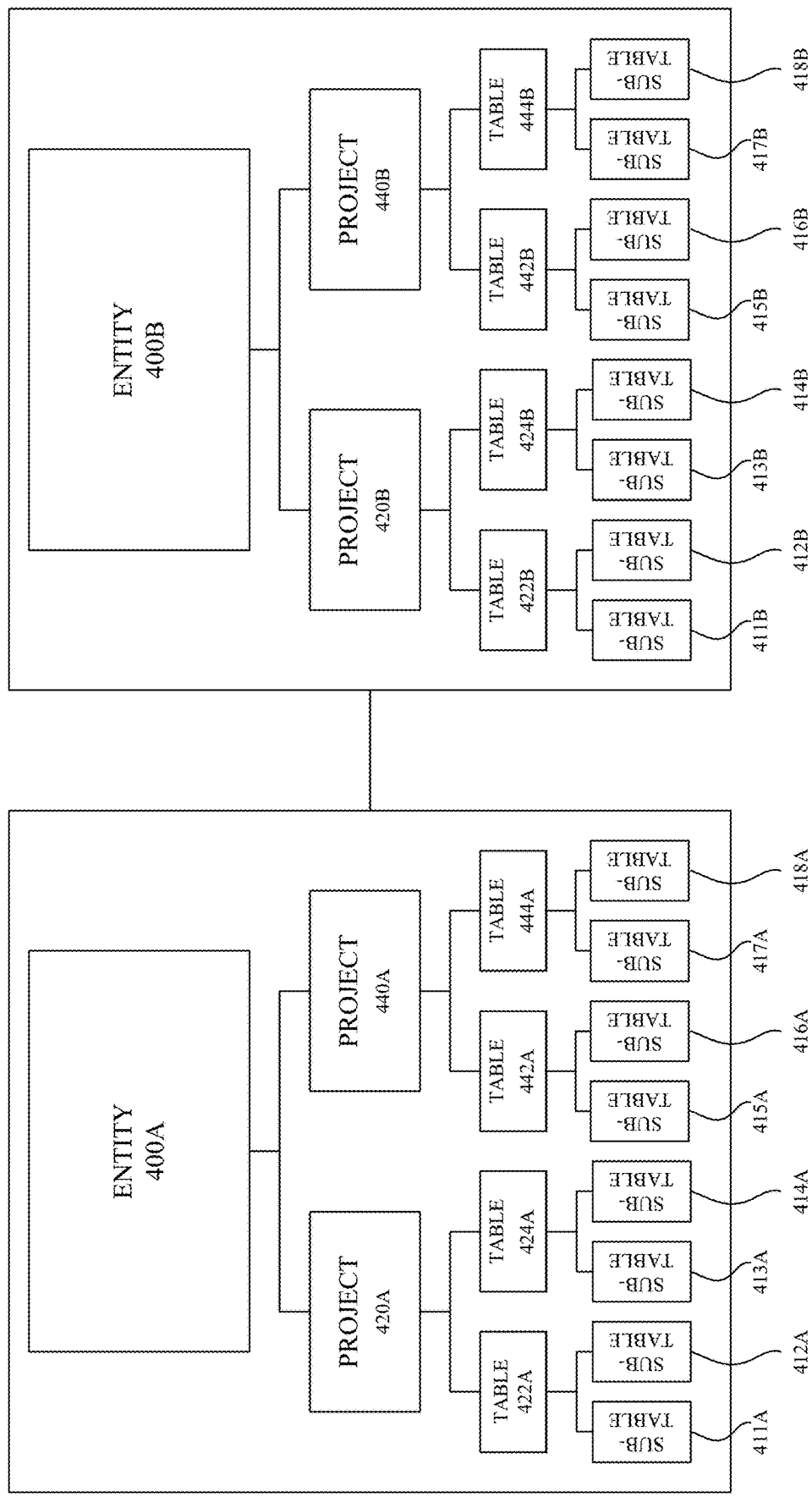
FIG. 4 illustrates an exemplary hierarchical relationship between multiple tables, consistent with some embodiments of the present disclosure.

By way of example, FIG. 4 illustrates an exemplary hierarchical relationship between multiple tables, consistent with some embodiments of the present disclosure. Entity 400A may include projects 420A and 440A, and entity 400B may include projects 420B and 440B. As previously described, an entity may refer to an individual, a team, a group, a department, a division, a subsidiary, a company, a contractor, an agent or representative, or any independent, distinct organization (e.g., a business or a government unit) that has an identity separate from those of its members. Entity 400A and entity 400B may include any number of projects, each project may include one or more tables, and each table may include any number of sub-tables including the absence of sub-tables. As illustrated in FIG. 4, a hierarchical structural relationship between multiple tables (also referred to as boards) may include an entity 400A, projects 420A and 440A associated with entity 400A, project 420A may include tables 422A and 424A, and project 440A may include tables 442A and 444A. Further, table 422A may include sub-tables 411A and 412A, table 424A may include sub-tables 413A and 414A, table 442A may include sub-tables 415A and 416A, and table 444A may include sub-tables 417A and 418A. It is to be appreciated by a person of ordinary skill in the art that the illustrated structural hierarchical relationship is exemplary, and may include more or fewer tables, levels of sub-ordination, or combinations thereof.

Consistent with some disclosed embodiments, some exemplary relationships between the first and the second table are described herein with reference to FIG. 4. For example, the first table may include a sub-table 411A and the second table may include a sub-table 411B of table 422B associated with project 420B of entity 400B, or a sub-table 417B of table 444B associated with project 440B of entity 400B, or a sub-table 417A of table 444A associated with project 440A of entity 400A. Alternatively, the first table may include a table 424A associated with project 420A and the second table may include a sub-table 412B of table 422B associated with project 420B of entity 400B, or a table 442B associated with project 440B of entity 400B, or a table 442A associated with project 440A of entity 400A, or any table associated with one or more entities, one or more projects, or combinations thereof.

Consistent with some disclosed embodiments, at least one processor of the system may be configured to display a joint logical sentence structure template including a first definable condition and a second definable condition. A logical sentence structure template or a logical template (sometimes referred to as a "recipe" or an "automation") may include a logical organization of elements for implementing a conditional action. In some embodiments, the logical organization of elements may be a semantic statement or a rule (e.g., a logical sentence). A joint logical sentence structure template, also referred to herein as a joint logical template may include an automation recipe, elements of which may be mapped to more than one table, such as a first table and a second table. A joint logical template may include one or more user-definable, or configurable elements. A definable condition may be a requirement that may be configured or altered based on a user input or selection. The user-definable element may be a triggering element or an action element, activated or deactivated as a whole, or may be activated with configuration or alteration in accordance with user inputs. A first definable condition may include a triggering element or an action element associated with a first table, and a second definable condition may include a triggering element or an action element associated with a second table.

A definable condition may be presented in any manner such as being displayed in bold, underlining, or any other differentiating manner, representing that it is user-definable. In some embodiments, a definable condition may be dynamic such that input of at least one definable condition may be configured to cause a change in the joint logical template. A dynamic definable condition of a joint logical template may include a user-definable condition, that when altered, can cause a change in the joint logical template. A change of the joint logical template may refer to a change in structure or elements (e.g., triggers and actions, or predefined requirements and user-definable conditions).

In some embodiments, the joint logical template may be implemented as program codes or instructions stored in a non-transitory computer-readable medium of the system. The at least one processor of the system may execute the program codes or instructions to perform the conditional action in accordance with the joint logical template.

Aspects of this disclosure may display a joint logical template, for example, via a display screen associated with a computing device such as a PC, laptop, tablet, projector, cell phone, or a personal wearable device. A logical template may also be presented virtually through AR or VR glasses, or through a holographic display. Other mechanisms of presenting may also be used to enable a user to visually comprehend presented information and provide input through an interface (e.g., a touch screen, keyboard, mouse, and more). In some embodiments, the logical template may be displayed in a user interface. The user interface, as referred to herein, may be a presentation of a web page, a mobile-application interface, a software interface, or any graphical interface (GUI) that enables interactions between a human and a machine via the interactive element. The user interface may include, for example, a webpage element that overlays an underlying webpage. In some embodiments, a computing device that implements the operations may provide the user interface that includes an interactive element. The interactive element may be a mouse cursor, a touchable area (as on a touchscreen), an application program interface (API) that receives a keyboard input, or any hardware or software component that may receive user inputs.

Consistent with some disclosed embodiments, at least one processor of the system may be configured to link input options for a first definable condition to a first table and link input options for a second definable condition to a second table. Linking may refer to associating or establishing a relationship or connection between two things (e.g., objects, data, interfaces, and more). For example, if the two or more things are stored as digital data in a non-transitory computer-readable medium (e.g., a memory or a storage device), the relationship or connection may be established by linking the two or more things, or by assigning a common code, address, or other designation to the two or more things in the non-transitory computer-readable medium.

Linking input options may refer to enabling input for the definable conditions into a selected joint logical template. An input for a definable condition may refer to any data, information, or indication to be used for configuring the definable condition. The input options for a definable condition may be linked or "mapped" to a table or cells of a table that have information stored therein. In some embodiments, one or more rows or columns of a table may be linked as input options based on the definable condition. For example, if the joint logical template includes a first definable condition preceded by a "when," the input options may be linked to a particular column or a row including relevant trigger data. In some embodiments, the input options may include an entire table.

The input options for the first and the second definable conditions may be linked to the first table and the second table, respectively. As previously described, the second table may be a sub-table of the first table, a different table associated with the same project, a different table associated with a different project, a table associated with the same entity as the first table, or a table associated with a different entity, or combinations thereof.

In some embodiments, input options for a definable condition may be based on authorization or permission to access data within a linked table. For example, a table may include restricted, confidential, or privileged information stored in cells that may only be accessed by entities such as an administrator, a project manager, an investor, a particular team or entity, or other authorized individuals or entities. In such a case, linking the input options may include requiring a password or authentication to access the desired information.

In some disclosed embodiments, linking input options for a first definable condition to a first table may include selecting as a default a current table being accessed by an entity. A user or an entity may frequently access a table for reviewing, modifying, updating, or storing information in cells. The frequently accessed table may be a master table where all the information may be stored and updated dynamically, or periodically, or based on a schedule. In some embodiments, a table being accessed by a user or an entity may be the master table or another table that the user may be updating, modifying, configuring, or reviewing. The current table being accessed by the user or the entity may be selected as a default input option for linking with the first definable condition based on the frequency of access, relevance, size, authorized users, content, or other characteristics of the table. The current table may be determined based on the entity's most recently accessed table. Selecting a table as a default may include automatically or manually mapping or associating the table for an input option or for a definable variable. For example, the system may be configured to automatically grant access to the table based on a user's profile, historical records, projects, location, qualification, or preferences. In another example, the system may be configured to receive a selection of a table to assign the table as a default for an input option or for a definable variable.

In some embodiments, at least one processor of the system may be configured to generate a joint rule for a first table and a second table by storing a first value for a first definable condition and storing a second value for a second definable condition. A joint rule may refer to a joint logical template in which all or some of the conditions or the elements have been defined. Generating a joint rule may include defining or populating the first and the second definable conditions. In some embodiments, the joint rule may be generated by storing values for the first and the second definable condition. The first value for the first definable condition may be linked to a cell, a row, a column, or a portion of the first table. The second value for the second definable condition may be linked to a cell, a row, a column, or a portion of the second table. In some embodiments, a joint rule generated by defining the first and the second conditions may form a predefined joint logical template or a predefined automation recipe which can be implemented on a table, or across multiple tables associated with different projects and entities, or at any level of a hierarchical arrangement of tables. A user may create any number of joint rules and store the joint rules in a memory, storage device, or data server. Alternatively, the joint rules may be stored locally on a computing device, or on a webpage, or an allocated space on another board. For example, the joint rules may be stored in a common storage space on a website or a portal, such as an "automation marketplace." As referred to herein, an automation marketplace may refer to a webpage, a portal, a website, or an allocated space on a user-interface, where the joint rules may be stored.

Consistent with some disclosed embodiments, at least one processor of the system may be configured to apply a joint rule across a first table and a second table. A joint rule may be applied to any combination of one or more tables (e.g., boards), sub-tables, groupings, tables associated with projects, tables associated with entities, or any other table in a collaborative workspace. For example, a joint rule may be applied to any number of tables or boards within a project, across projects, associated with an entity, or associated with multiple entities. In some embodiments, one or more joint rules may be applied to a board, or a joint rule may be applied to one or more boards. In some embodiments, a joint rule stored in a common storage space may be accessed by a user and may be applied to one or more boards simultaneously. The application of a joint rule on a board may be activated and/or de-activated based on a user input. For example, during a phase of a project, a user may simultaneously apply a joint rule to four boards associated with the project and upon completion of the phase, may deactivate the joint rule on one or more of the four boards originally selected. Alternatively, a user may select the board from a list of available boards to which a joint rule may be applied.

Figure 5:
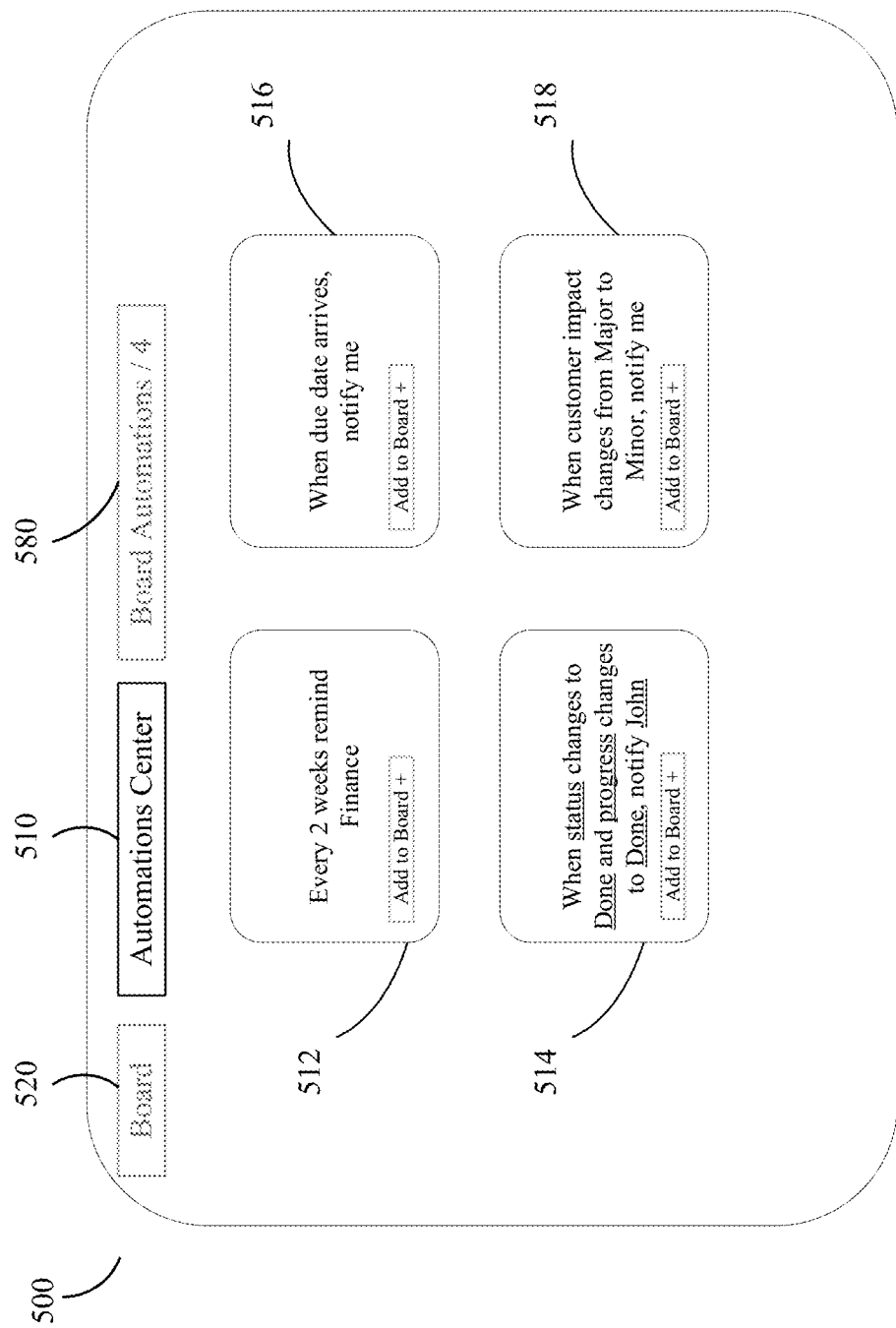
FIG. 5 illustrates an exemplary user-interface including joint rules stored in an allocated storage and display space, consistent with some embodiments of the present disclosure.

FIG. 5 illustrates an exemplary user-interface including joint rules stored in an allocated storage and display space, consistent with some embodiments of the present disclosure. User interface 500 may include allocated webpages or portions of a webpage to display an automation center including joint rules, automation recipes, boards that the joint rules or automation recipes may be applied to, user profiles (not shown), or other digital information. Space 510 may be allocated to display and the automation marketplace or automation center configured to store the exemplary joint rules 512, 514, 516, and 518. For example, joint rule 514 may be applied to one or more boards simultaneously. Joint rule 514 provides a first definable variable "status" and a second definable variable "progress." The first definable variable may be mapped to a first table and the second definable variable may be mapped to a second table. In the example provided by joint rule 514, when "status" and "progress" are both marked "Done," the system may be configured to send a notification to John. Selecting the option "Add to Board +" may generate a pop-up menu, drop-down list, a pick list, or any suitable interface to allow a user to apply the joint rule 514 to the selected boards. The selected boards may be associated with one or more projects, one or more entities, or one or more users. User interface 500 may also include allocated space 580 to display and store the automations being applied to a board 520. For example, element 580 may list, tabulate, or graphically present the rules being applied to board 520. In some embodiments, the user may be allowed to activate or deactivate an automation being applied to board 520 using a toggle button, or a radio button, for example.

Consistent with some disclosed embodiments, at least one processor of the system may be configured to trigger a joint rule when a first condition in a first table is met and a second condition in a second table is met. The triggering event may include an occurrence where the conditions of a joint rule have been satisfied. "Triggering" may refer to invoking or activating a joint rule to be implemented when the condition of the rule is satisfied and may be defined as a triggering event. The triggering may occur as a response to an input such that the input satisfies the first condition in the first table and the second condition in the second table. The input may be from a user action or from a change of information contained in a user's table, in another table, across multiple tables, across multiple user devices, or from third-party applications, as previously discussed above. Triggering may be caused manually, such as through a user action, or may be caused automatically, such as through a logical rule, logical combination rule, or logical templates associated with a table, or a joint rule. For example, a trigger may include an input of a data item that is recognized by at least one processor that brings about another action.

In some embodiments, a joint rule may include an outcome of altering at least one of a first table, a second table, or a third table as a result of the triggering. Altering a table or tablature displays may refer to any procedure or process of changing a visual presentation form of a display of a table in a collaborative work system, as previously described. The procedures or processes for altering the tablature displays may involve, for example, any combination of modification, addition, or removal operated on a color, a font, a typeface, a shape, a size, a column-row arrangement, or any visual effect of a visible object in the table. The visible object may include a table cell, a table border line, a table header, or any table elements, and may further include a number, a text, a symbol, a mark, a character, a date, a time, an icon, an avatar, a hyperlink, a picture, a video, an animation, or any visible item included in any table element. In some embodiments, altering a first table or a second table may include altering the information stored in the first cells or the second cells, altering a presentation of data in the first or the second cells, altering a visual effect of a visual object.

In some disclosed embodiments, triggering of a joint rule may include an outcome of establishing or altering a third table for storing data associated with the trigger of the joint rule. Establishing a third table may include generating a new, independent table, or may include presenting new information within the first or second tables. A third table, in some embodiments, may refer to a hidden table such as an archive or an addition to an existing database of tables. For example, the trigger may be that "a task is overdue" to cause a presentation of an exclamation mark as a graphical indicator of a task being overdue. In some joint rules, the trigger may result in an indicator that graphically presents the remaining time for a task, an indicator that a task is done, or any other graphical, alphanumeric, or combination of graphical and alphanumeric indication regarding the item or task. In some embodiments, the third table may be established as an independent sub-table (e.g., added as a new sub-table). In some embodiments, the third table may be established as a part of an existing table. The established third table may not be linked or associated with the joint rule that connects the first and the second tables. In yet another example, the third table may already exist and be altered in response to the activation of the joint rule. For example, a joint rule may monitor conditions from a first table (employee 1) and from a second table (employee 2). As a result of a condition being "done" in both the first and second tables, a third table (supervisor) may be altered to provide an indication that both conditions are "done" in the first and second tables. In this way, projects with multiple dependencies may be managed.

Consistent with some disclosed embodiments, linking input options for a second definable condition to a second table may include linking the second table to a first table via a joint rule. The joint rule may enable a user to connect or associate the first and the second tables such that the data in the first and the second tables may be duplicated. Duplicating the information stored may allow the user to link input options for the first definable condition to the second table in addition to the first table, or link input options for the second definable condition to the first table in addition to the second table. In some embodiments, the at least one processor may be further configured to employ the joint rule to alter information in at least one of the first cells based on information in at least one of the second cells. The first and the second tables may be linked through the joint rule such that the joint rule, when triggered, may alter the information stored in the first cells associated with the first table based on information stored in the second cells. For example, the first table including the first cells may store information associated with a software production team of a project, and the second table including the second cells may store information associated with a software testing team of the project. The joint rule may be constructed such that when the software testing team (information in the second cells) has successfully completed their tests, the software production team (information in the first cells) may be notified by creation of a "status" column in the first table, indicating that the software production team may proceed based on the information of the software testing results. As an example, if the software testing team is debugging the code related with some features of an application, the status column in the first table may indicate "debugging," or "waiting."

In some embodiments, a joint rule may include an outcome of sending a notification as a result of a triggering. A computing device configured to implement the joint rule may send a notification when the joint rule is triggered, as previously discussed above. The notification may include an email, a text message, a phone call, an application push notification, a prompt, or any combination of any form of notifications. The notification may be sent, for example, to an email address, a phone number, a mobile application interface, within the application, or any combination of any device or user interface to which the user has access. By doing so, in some exemplary embodiments, a user may be notified of the statuses of the tasks of a project in real-time or at a scheduled time. For example, the joint rule may state that, when a task is overdue, not only a display a change in the first, second, or the third table, but also send a notification to a particular person or persons.

In some embodiments, the joint rule may be a communications rule. A communications rule may include any logical rule associated with sending a communication. The logical rule may be presented as an automation or a logical sentence structure as described previously. The communications rule may monitor the table for certain conditions to trigger the activation of the communications rule and send the notification. Owners or users of a board may generate and customize communication rules incorporating their preferences for receiving or sending notifications relating to the table, group of items, or individual items. For example, a user may specify to only send notifications by email regarding certain items and to send a text message for other items. For example, the user may specify to send alerts regarding a commentary thread by email, but specify to send text messages regarding status changes. Additionally, the user may customize the system to send summary notifications for certain items such as sending only a single notification with the summary of changes made to an item for a predefined period of time on a periodic basis. For example, user may set up his or her notification to be sent at specific times (e.g., only on Mondays at 9 am). The user may also enable multiple communications rules for a single table, or may enable one or more communications rules applicable to a plurality of tables.

In some embodiments, a joint rule may include activating a control for an external device, as a result of the triggering. An external device may refer to a cellphone, a personal computer, a laptop, a tablet, a monitor, a wearable device, a display screen, heads-up display, virtual reality (VR) and augmented reality (AR) devices, a dispenser, or any device capable of processing and/or displaying data. The joint rule may be constructed such that when the first and the second definable conditions are satisfied, the joint rule, upon triggering, may activate a control of the external device. For example, triggering of the joint rule may initiate a communications application on the external device. A communications application may include an internal or external website or program that performs a particular task or set of tasks. (e.g., Outlook™, Gmail™, SMS, Whatsapp™, Slack™, Facebook Messenger™, a proprietary application of the system, or any other medium that enables communication. In other words, the communications application may be an integrated (or accessed) third-party-provider application or an internal automated application. The communications application may be predefined or may be selected by a user. For example, the rule may provide the user with access to picklist permitting the user to specify, in defining the rule, which communications application will serve as the transmission mechanism for the message. Or, the rule template may predefine the communications application that may be used. In either scenario, automatic triggering may include accessing the defined communications application. In some embodiments, the joint rule may be predefined to enable sending an email, initiating a phone call, initiating a video conference call, sending text messages or any form of notification.

Figure 6:
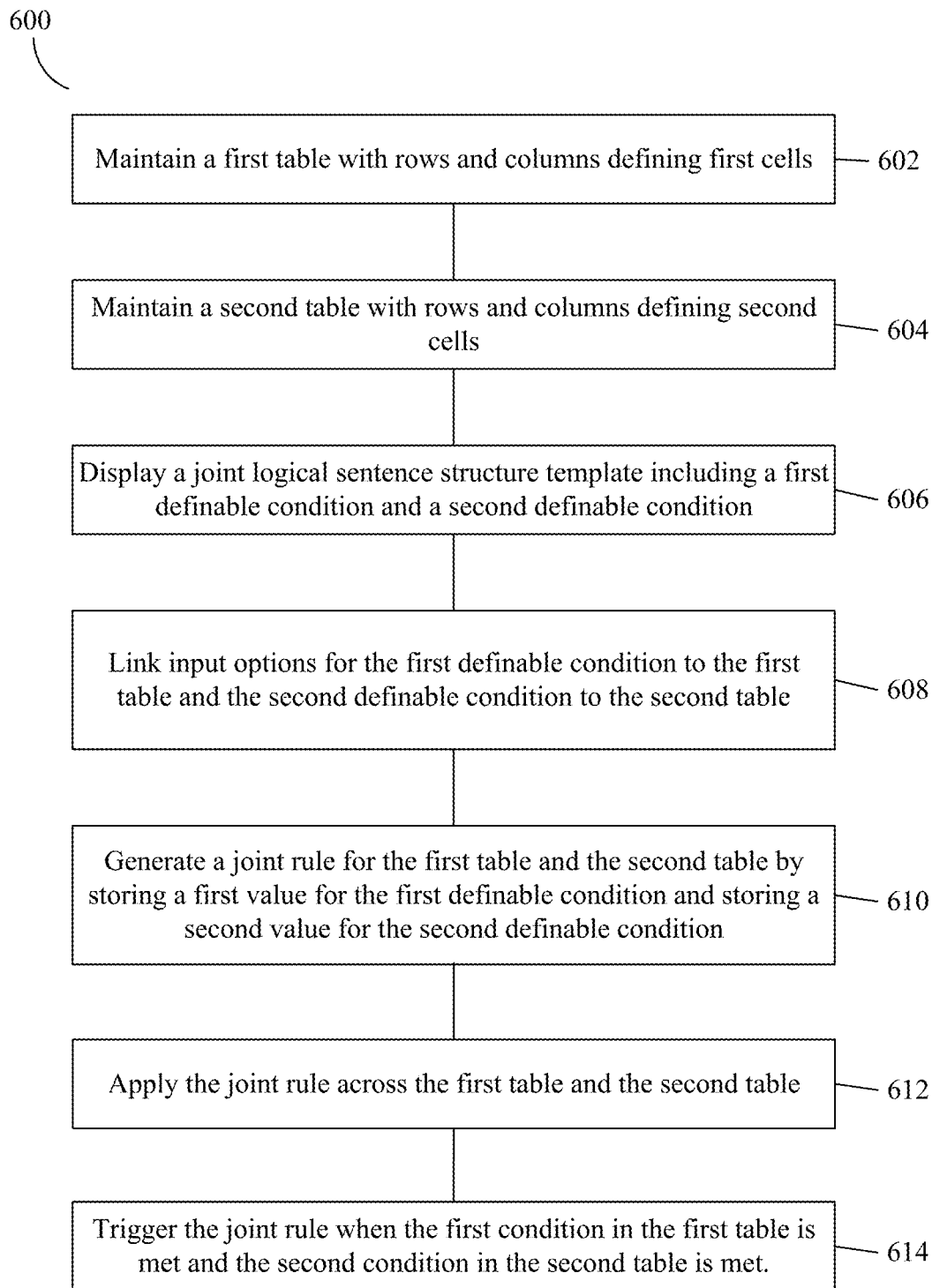
FIG. 6 is a block diagram of an example process for implementing multi-table automation triggers, consistent with some embodiments of the present disclosure.

FIG. 6 depicts a block diagram of an exemplary process for implementing multi-table automation triggers, consistent with some disclosed embodiments. While the block diagram may be described below in connection with certain implementation embodiments presented in other figures, those implementations are provided for illustrative purposes only, and are not intended to serve as a limitation on the block diagram. In some embodiments, the process 600 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 3 to 5 by way of example. In some embodiments, some aspects of the process 600 may be implemented as software (e.g., program codes or instructions) that are stored in a memory (e.g., the memory portion 122 in FIG. 1) or a non-transitory computer-readable medium. In some embodiments, some aspects of the process 600 may be implemented as hardware (e.g., a specific-purpose circuit). In some embodiments, the process 600 may be implemented as a combination of software and hardware.

At block 602, processing circuitry 110 may maintain a first table with rows and columns defining first cells. As discussed in greater detail earlier, maintaining a first table may include storing a form of table, or storing values associated with the first cells, or may generally include one or more of saving, storing, recording, updating, tracking, counting, editing, viewing, displaying, aggregating, combining, or otherwise retaining in a repository information for representation in a table.

At block 604, processing circuitry 110 may maintain a second table with rows and columns defining second cells. The second table may be a sub-table of the first table, a different table within a project, a table associated with another project of the same entity, or a table associated with a different project of a different entity.

At block 606, processing circuitry 110 may be configured to display a joint logical sentence structure template including a first definable condition and a second definable condition. A definable condition may be a requirement that may be configured or altered based on a user input. The user-definable element may be a triggering element or an action element, activated or deactivated as a whole, or may be activated with configuration or alteration in accordance with user inputs.

At block 608, processing circuitry 110 may link input options for the first definable condition to the first table and link input options for the second definable condition to the second table. For example, the values for the first definable condition may be linked with the first table associated with a project of an entity, and the values for the second definable condition may be linked with a second table associated with another project of the entity.

At block 610, processing circuitry 110 may generate a joint rule for the first table and the second table by storing a first value for the first definable condition and storing a second value for the second definable condition. A joint rule may be generated by defining the first and the second conditions from different tables and may be implemented across multiple tables associated with different projects and entities.

At block 612, processing circuitry 110 may apply the joint rule across the first table and the second table. A joint rule may be applied to any combination of two or more tables, sub-tables, boards, groupings, tables associated with projects, tables associated with entities, or any other table in a collaborative workspace. For example, a joint rule may be applied to any number of tables or boards within a project, across projects, associated with an entity, or associated with multiple entities.

In some embodiments, the application of a joint rule on a board may be activated and/or de-activated based on a user input. For example, during a phase of a project, a user may simultaneously apply a joint rule to four boards associated with the project and upon completion of the phase, may deactivate the joint rule on one or more of the four boards originally selected. Alternatively, a user may select the board from a list of available boards to which a joint rule may be applied.

At block 614, processing circuitry 110 may trigger the joint rule when the first condition in the first table is met and the second condition in the second table is met. Triggering the joint rule may be caused manually, such as through a user action, or may be caused automatically, such as through a logical rule, logical combination rule, or logical templates associated with a board. For example, a trigger may include an input of a data item that is recognized by at least one processor that brings about another action.

Although there may be available tools for implementing tables with logical rules, there is a lack of technical solutions to provide systems, methods, devices, and computer-readable media for employing self-configuring table automations catered to specific vocations.

There is a need or unconventional systems, methods, devices, and computer-readable media for presenting a plurality of alternative automation packages for application to a table, wherein each package includes a plurality of automations, and wherein each automation is configured to cause an action in response to at least one condition detected in the table; identify a selection of a package from the plurality of packages; automatically configure a first condition in a particular automation in the selected package based on data in the table; display a second undefined condition of the particular automation, wherein the second undefined condition requires further configuration; receive an input for configuring the second undefined condition; configure the second undefined condition using the input to cause the second undefined condition to become a second defined condition; and apply the particular automation to the table. Some embodiments provide advantages over prior systems that merely provide tables with conditional rules by providing targeted solution packages based on vacations to improve system processing to more efficiently initialize set up and process information based on specific scenarios.

Aspects of this disclosure may provide a technical solution to the challenging technical problem of project management on collaborative work systems and may relate to a system employing self-configuring table automations. For ease of discussion, some examples are described below with reference to systems, devices, methods, and/or computer-readable media, with the understanding that discussions of each apply equally to the others. For example, some aspects of methods may be implemented by a computing device or software running thereon. The computing device may include at least one processor. Consistent with some disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Some disclosed embodiments may involve at least one processor configured to present a plurality of alternative automation packages, identify a selection of a package, automatically configure a first condition in a particular automation, display a second undefined condition of the particular automation, receive an input, configure the second undefined condition, apply a particular automation to a table, among other functions.

An automation, which, by way of example, may be implemented via a logical sentence structure template, may be a process that responds to a trigger or condition to produce an outcome. A logical rule may underly the automation, the logical rule including one or more logical connectors, and configured to act on table data to produce an outcome. An automation may also be considered as a "recipe" having a logical organization of elements for implementing a conditional action. The automation, for example, may be implemented via a recipe, a template, or a sentence including one or more triggering elements (also referred to herein as "triggers") and one or more action elements (also referred to herein as "actions" hereinafter). An automation may be configured to cause an action in response to a trigger, such as an event or a condition, the occurrence or satisfaction of which may cause another event in the system, implemented by the automation. Triggers may occur as the result of one or more conditions in a single table or across multiple tables. Triggers further may also occur as the result of conditions being met across multiple tables and/or across multiple users or entities. An action of an automation may refer to a change of one or more components of the system. For example, the change may include addition, deletion, alteration, conversion, rearrangement, or any manner of manipulation of data stored in the system. As an example, in an automation or a logical sentence structure template such as "when a task is done, notify John," notifying John may correspond to the action performed in response to the automation trigger or condition being met, i.e. task being done, and the logical connector "when." Automations may be broadly referred to as processes governed by rules. In some embodiments, the rules may include a mathematical function, a conditional function, computer-readable instructions, or other executable functions. Self-configuring table automations may include automations that automatically seek information from tables to auto-populate conditions and fields of the automations.

An automation package may refer to a single automation or a group of automations configured to perform an action when a condition is met. One or more automations of an automation package may be associated with a table or table data. "Associating," in this example and as used in this context, may refer to processes or procedures of establishing a relationship or connection between at least an automation and at least a table. The relationship or connection may be established by linking the automation and the table, or by assigning a common code, address, or other designation to the automation and the table. One or more automations in an automation package may be customized for a profession, a vocation, an industry, a technology, an occupation, a business, or other entities having collaborative workspaces. One or more automations in an automation package may also be customized based on specific use cases for certain tasks, such as tracking project progress, enabling communications between remote individuals, or managing files between teams.

Aspects of this disclosure may involve presenting a plurality of alternative automation packages for application to a table, wherein each package may include a plurality of automations, and wherein each automation may be configured to cause an action in response to at least one condition detected in the table. A table may include those items described herein in connection with the term "tablature," and may include horizontal and vertical rows for presenting, displaying, or enabling access to information stored therein. A table may be presented on a screen associated with a computing device or via any electronic device that displays or projects information on a surface or virtually. An intersection of multiple rows (and/or columns) may represent a cell. For example, a cell may be represented as an intersection of a horizontal row (or referred to as a "horizontal column") and a vertical row (or referred to as a "vertical column"). A cell may contain a value, a color, a word, a graphic, a symbol, a GIF, a meme, any combination thereof, or any other data. In some embodiments, a table may be presented in two dimensions, three dimensions, or more. A table, a board, a workboard, a dashboard, or a part thereof, including digital data (e.g., computer readable data) may be populated via a data structure.

A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure does not require information to be co-located. It may be distributed across multiple servers, for example, that may be owned or operated by the same or different entities. Thus, the term "data structure" in the singular is inclusive of plural data structures.

Presenting a plurality of alternative automation packages may refer to one or more of displaying or projecting a visual representation of automation packages available, or displaying one or more automations associated with an automation package, or displaying automation packages in a pop-up menu, a drop-down list, a pick list, or any suitable interface to allow a user to select an alternative automation package. The alternative automation packages may be displayed via a display screen associated with a computing device such as a PC, laptop, tablet, projector, cell phone, or a personal wearable device as discussed above. The one or more automation packages may also be presented virtually through AR or VR glasses, in more than two dimensions. Other mechanisms of presenting may also be used to enable a user to visually comprehend presented information. Application of an automation package to a table may refer to the application of one or more automations of the automation package to an associated table such that a predefined action may be performed when a condition of the one or more automations is met.

Each automation package may include a plurality of automations. As mentioned previously, consistent with some disclosed embodiments, an automation may be broadly referred to as a rule or a logical rule that associates at least two of a plurality of columns with each other. In some embodiments, the rules may include a mathematical function that determines the value of a column based on values of one or more columns (e.g., a column may be customized to display a due date determined by adding 50 days to the date indicated in another column). In some other embodiments, the rules may include conditional functions that determine the appearance of a column based on the value of the column itself and/or the values of one or more other columns (e.g., a column may turn red when a due date specified therein has passed). In some further embodiments, the rules may include computer-readable instructions that perform certain actions using third-party services (e.g., a template may control a smart light bulb when the value of a column meets a predetermined condition), change the appearances of one or more columns, and/or change the values of one or more columns (e.g., a column may be linked to another column to display the same information).

Consistent with some disclosed embodiments, each automation may include a logical sentence structure including definable conditions. A logical sentence structure may include a logical organization of elements for implementing a conditional action. In some embodiments, the logical organization of elements may be a semantic statement or a rule (e.g., a logical sentence). A definable condition may be a requirement that may be configured or altered based on a user input or selection. The user-definable element may be a triggering element or an action element, activated or deactivated as a whole, or may be activated with configuration or alteration in accordance with user inputs. A definable condition may be presented in any manner such as being displayed in bold, underlining, or any other differentiating manner, representing that it is user-definable.

Figure 7:
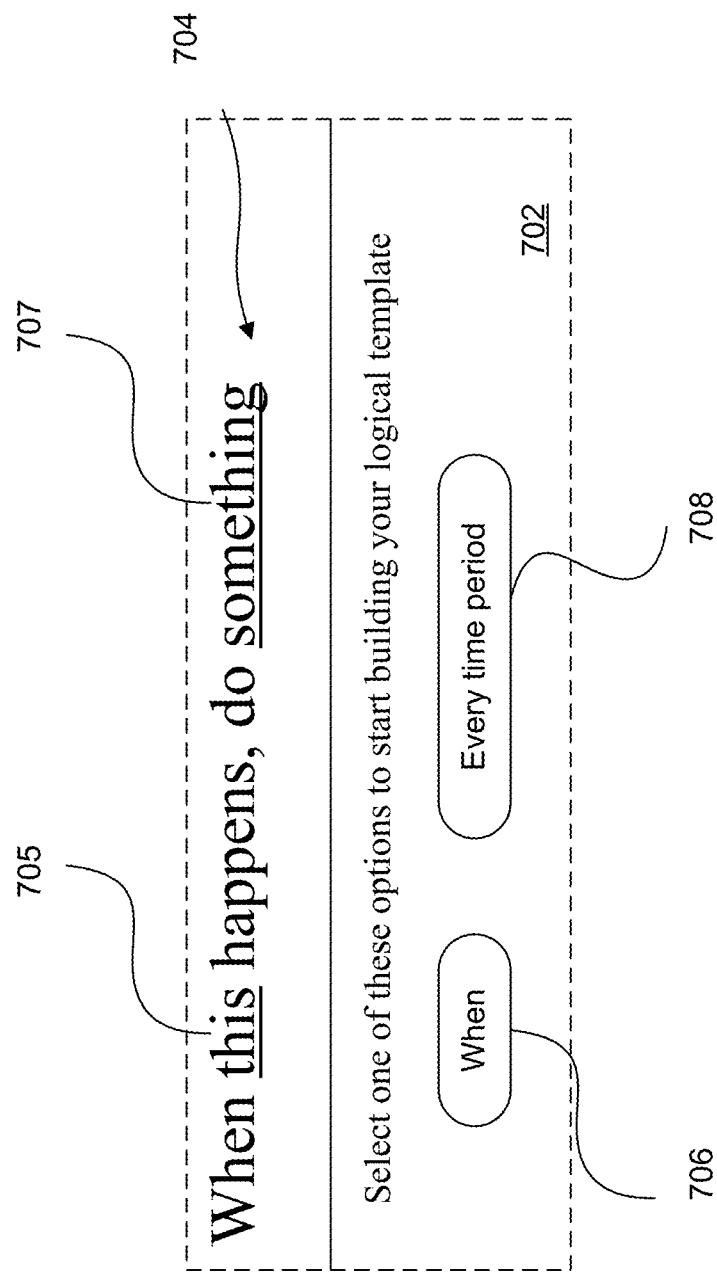
FIG. 7 illustrates an example of a logical template showing a user-definable condition in a user interface, consistent with some embodiments of the present disclosure.

By way of example, in FIG. 7, the logical sentence structure 704 includes predefined requirements 706 and 708 such as "when," "happens," and "do," and definable conditions 705 and 707 such as "this" and "something." For example, the predefined requirement "when" may only be activated as a whole by receiving a user input indicating that a user selects an interactive element 706 (e.g., a button). In another example, the predefined requirement "when" may only be deactivated as a whole by receiving a user input indicating that a user clicks an interactive element 708 (e.g., a button) so that the predefined requirement may be removed and may be replaced. It is to be appreciated that logical sentence structure 704 is exemplary, and logical sentence structures may include one or more predefined requirements and one or more definable conditions. It is also to be appreciated that an automation package may include a plurality of automations or logical sentence structures that may act independently or collaboratively.

In some embodiments, each automation may be configured to cause an action in response to at least one condition detected in the table. As described previously, an automation may be configured to cause an action in response to a trigger, such as an event or a condition, the occurrence or satisfaction of which may cause another event in the system, implemented by the automation. Triggers may occur as the result of at least one or more conditions being detected in a table. For example, a communications rule may include a trigger that activates when a specific value in a specific cell meets a criterion. A trigger may include an aspect of the rule (e.g., code) that recognizes a specific value in a cell, determines that it meets a criterion, and causes a resulting event, circumstance, action, process, or situation to occur as a result. A specific value contained in cells may include numeric, alphanumeric, graphical information, or any combination thereof. Similarly, a criterion associated with a communications rule may contain numeric, alphanumeric, graphical information, a combination thereof, or a range of such information (e.g., a range bounded on one or more ends by at least one boundary defining more than one specific value that may activate the trigger, such as a numeric range, a region, a category, a class, or any other criterion that defines multiple values.) When a match is determined between information in the cell and a criterion associated with the trigger, the condition of the trigger may be met and may be said to be a condition detected in the table, and result in an automation becoming activated to cause an action, such as a communications rule being triggered to send an alert.

A condition, as used in this context, may refer to any state of information contained in any column type or datatype stored in a column of an associated table. An automation may apply to any column type and may apply to an infinite number of combinations of column types such as a Task column, a Person column, a Date column, a Contact column, a Time Tracking column, a Location column, a World Clock column, a File column, or any other column type associated with the table. For example, in an automation or a logical sentence structure associated with a library such as "When a Person is absent at work, perform a Task," the condition may be associated with a "Person" column, and the action may include the column "Task." In some embodiments, the column or datatype associated with the condition may include, but is not limited to, a Date column, a Contact column, a Time Tracking column, a Location column, or other column types. The types and number of columns that may be subject to a predefined logical combination rule, and the action initiated as a result of that rule are limitless. Any column of the table may display cells of a single datatype or of multiple datatypes. A single datatype column may be one where all cells are uniform in at least one aspect or characteristic. The characteristic may be numeric values only, characters only, alphanumeric values, graphic elements only, closed lists of elements, single formatting, a specific value range, or any constraint on the format or type of column data. In some embodiments, the first column may be at least a portion of a single datatype (e.g., texts) column-oriented data structure. A single datatype column-oriented data structure may be a digital data structure of a table that includes columns where all cells of the columns may be programmed to include a single category of data.

A condition detected in the table may refer to a condition being met. According to some aspects of the disclosure, an automation may include a trigger that may be activated when a specific value in a specific cell of a table meets a criterion or a condition. A trigger may include an aspect of the rule (e.g., code) that recognizes a specific value in a cell, determines that it meets a criterion, and causes a resulting event, circumstance, action, process, or situation to occur as a result. A specific value contained in cells may include numeric, alphanumeric, or graphical information. Similarly, a criterion associated with a communications rule may contain numeric, alphanumeric, or graphical information, or a range of such information (e.g., a range bounded on one or more ends by at least one boundary defining more than one specific value that may activate the trigger, such as a numeric range, a region, a category, a class, or any other criterion that defines multiple values.) When a match is detected between information in the cell and a criterion associated with the trigger, the criterion of the trigger may be met, and a result of the communications rule may be triggered.

Consistent with some disclosed embodiments, an action may include at least one of a change in data in a table or in another table, or a change in control of an external device. In response to at least one condition being met or occurrence of a triggering event, the processor may be configured to alter a display in an associated table, or a non-associated table. Altering or making a change may refer to processes or procedures of modifying, adding, removing, rearranging, or any way of changing an object. The "display" in the table may include a visual representation in the table as described herein. In some embodiments, the display of the table may be altered by one or more of adding or changing data in the table, removing data, changing a visual effect of a visual object in the table, adding a visual object or indication to the table. The visual effect may include a change in a color, a font, a typeface, a strikethrough, a shape, a size, a column-row arrangement, or any characteristic in visual presentation. The visual object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

In some embodiments, as a result of triggering, the action may include a change in control of an external device. The control of an external device may include activating, deactivating, charging, operating, initiating, or other control functions of the external device. An external device may refer to a cellphone, a personal computer, a laptop, a tablet, a monitor, a wearable device, a display screen, heads-up display, virtual reality (VR) and augmented reality (AR) devices, dispensers (e.g., vending machine), or any device capable of processing and/or displaying data that may result in a physical action. For example, triggering of the condition may initiate a dispenser to dispense a physical object, such as a physical reward or food item. In another example, triggering of the condition may initiate a communications application on the external device. A communications application may include an internal or external website or program that performs a particular task or set of tasks. (e.g., Outlook™, Gmail™, SMS, Whatsapp™, Slack™, Facebook Messenger™, a proprietary application of the system, or any other medium that enables communication. In other words, the communications application may be an integrated (or accessed) third-party-provider application or an internal automated application. The communications application may be predefined or may be selected by a user. For example, an automation may provide the user with access to a picklist permitting the user to specify, in defining the automation, which communications application will serve as the transmission mechanism for the message. Or, the logical template may predefine the communications application that may be used. In either scenario, automatic triggering may include accessing the defined communications application. In some embodiments, the automation may be predefined to enable sending an email, initiating a phone call, initiating a video conference call, sending text messages, activating an alarm, or any form of notification.

Some disclosed embodiments may involve identifying a selection of a package from a plurality of packages. Identifying an automation package may occur in a computing device in response to a user selection of an automation package or an alternative automation package from a plurality of alternative automation packages. A computing device may provide a user interface that includes an interactive element for identifying or receiving a user selection. The user interface may be a web page, a mobile-application interface, a software interface, or any graphical interface that enables interactions between a human and a machine. As previously mentioned, the automation packages may include one or more automations and the user may select an automation package based on existing automations including predefined and definable conditions.

Some disclosed embodiments may involve automatically configuring a first condition in a particular automation in the selected package based on data in the table. Data in the table may include, but is not limited to, a number, a text, a value, a symbol, a mark, a character, a date, a time, an icon, an avatar, a hyperlink, a picture, a video, an animation, or any visible item or information stored in a cell of the table or associated with a cell of the table (e.g., linked data). In some embodiments, data may be sorted or arranged in columns such that one column in the table includes similar data, and each column may have an associated column heading. In this disclosure, a column heading associated with a column may refer to a text associated with a column within a table and indicative of the data stored within the column. For example, a column with the column heading "Project Owner" may include a name, a photograph, or other identification information of the employee assigned as the owner of a project. In a non-limiting example, the associated column heading may be located in a top cell of the column including the text.

An automation may include any number of conditions, such as at least two conditions, of which one condition may include an automatically configurable condition and the second condition may include an undefined condition. Automatically configuring a condition based on data in the table may include mapping column heading information in the table to column heading information in the particular automation. Mapping may refer to linking or associating or establishing a relationship or a connection between two things (e.g., objects, data, interfaces, data objects, tables, and more). For example, if the two or more things are stored as digital data in a non-transitory computer-readable medium (e.g., a memory or a storage device), the relationship or connection may be established by linking the two or more things, or by assigning a common code, address, or other designation to the two or more things in the non-transitory computer-readable medium. In some embodiments, column heading information in the table may be "mapped" or linked to the column heading information (e.g., a definable condition or variable) in the automation. For example, if the automation package is customized for the legal profession, one or more automations in the automation package may include a condition "When the billed hours exceeds HOURS and the delivery date passes DATE, notify supervising attorney." In this example, the first condition, "billed hours exceeds HOURS," may be automatically configured by associating it with the column containing information about a working attorney's billed hours in the table. In some embodiments, the mapping may occur using artificial intelligence. The term "artificial intelligence" is defined earlier, and may refer, for example, to the simulation of human intelligence in machines or processors that exhibit traits associated with a human mind such as learning and problem-solving. Artificial intelligence, machine learning, or deep learning, or neural network processing techniques may enable the automatic learning through absorption of huge amounts of unstructured data such as text, images, or videos and user preferences analyzed over a period of time such as through statistical computation and analysis. Alternatively, or additionally, the mapping may occur using linguistic processing such as, for example, Natural Language Processing (NLP) techniques. Linguistic processing may involve determining phonemes (word sounds), applying phonological rules so that the sounds may be legitimately combined to form words, applying syntactic and semantic rules so that the words may be combined to form sentences, and other functions associated with identifying, interpreting, and regulating words or sentences. For example, a user may provide an audible input such as by "speaking" to select an automation package, or an automation within the selected automation package, or a condition of an automation within a selected automation package. In some embodiments, the mapping may occur using a combination of linguistic processing and artificial intelligence. For example, a neural network processor may be trained to identify and/or predict user preferences based on learning through linguistic processing and the user's historical preferences.

Some disclosed embodiments may involve displaying a second undefined condition of a particular automation, wherein a second undefined condition may require further configuration. Displaying an undefined condition in an automation may refer to presenting the condition to the user in an interactive format and presenting an indication the condition may not yet be fully defined. An undefined condition may refer to a configurable condition, in which the system may enable the user not only to select or deselect, but also to configure one or more elements thereof. For example, the system may enable the user to configure a maintained logical template in a dynamic manner, in which the user may create a new logical template that might not already exist in the system. In some embodiments, the system may enable the user to store the configured logical template in the system for future configurations or uses. In some embodiments, displaying the second undefined condition may include presenting a logical sentence structure with a variable field for subsequent completion. The second undefined condition may include an automation that includes a configurable trigger element, a configurable action element, or both. The second undefined condition may be presented to indicate that the condition has not yet been defined and that it is available for configuration, as discussed above. The automation may then be configured based on user input for the undefined condition, as discussed further below.

Some disclosed embodiments may involve receiving an input for configuring the second undefined condition. An input may be received via a user interface provided by the computing device. For configuring the second undefined condition, the user interface may enable the user to select a column, a column heading, a row, or any cell of a table associated with the automation. In some embodiments, the user interface may be a menu (e.g., a context menu) that may be prompted in response to a user input (e.g., a click or a finger tap on a button associated with the table).

In FIGS. 1 and 2, the generation of the user interface may be achieved by an application running on the computing device (e.g., the computing device 100 in FIGS. 1-2). The application may generate a user interface for rendering on a display of a user device (e.g., the user device 220-1, 220-2, or 220-m in FIG. 2). The user device may interact with the user interface using one or more physical elements (e.g., a mouse, a touchscreen, a touchpad, a keyboard, or any input/output device) that are associated with the user device.

The user interface may be a web page, a mobile-application interface, a software interface, or any graphical interface that enables interactions between a human and a machine via the interactive element. The user interface may include, for example, a webpage element that overlays an underlying webpage. In some embodiments, a computing device that implements the operations may provide the user interface that includes an interactive element. The interactive element may be a mouse cursor, a touchable area (as on a touchscreen), an application program interface (API) that receives a keyboard input, or any hardware or software component that may receive user inputs.

Some disclosed embodiments may be adapted to configure the second undefined condition using the input to cause the second undefined condition to become a second defined condition. In the selected automation, the first condition may already be automatically configured, and the second undefined condition may become a defined condition upon receiving a user input that configures the second undefined condition. Configuring the second undefined condition may involve enabling input options for the user-definable requirements into the selected automation. An input for a user-definable requirement may refer to any data, information, or indication to be used for configuring the user-definable condition.

By way of example, FIG. 7 illustrates an example of a logical template 704 showing a user-definable condition 706 in a user interface 702, consistent with some embodiments of the present disclosure. In FIG. 7, the user-definable condition 706 may be displayed in bold, underlining, or any other differentiating manner, representing that it is user-definable. In some embodiments, the system may display the user interface 702 after receiving data indicating that an interactive element of a user interface is activated (e.g., selected by a user). The user interface 702 displays the logical template 704 ("every time period do something") that includes the user-definable condition 706 ("every time period"). As illustrated, the user-definable condition 706 may be activated, as a whole, and invoke the display of the user interface 702.

Some disclosed embodiments may be configured to apply a particular automation to a table. In some embodiments, the particular automation may be applied to a specific table or a group of tables associated with the selected automation package. In some embodiments, the application of the particular automation may be activated and/or deactivated based on a user input. For example, the user may select the automation to be applied, from a plurality of automations in the selected automation package through a toggle that enables or disables specific automations of the automation package.

In some embodiments, the alternative automation packages may be vocationally-based. Vocationally-based automation packages may include pre-packaged groups of automations that are catered towards specific fields or professions (e.g., legal, R&D, marketing, medical, financial, and so on). The vocationally-based automation packages may include automation that function independently or collaboratively to achieve a certain result. For example, a real estate agent may select an automation package containing automations that are specific to tracking properties and automatically tracking the status of open houses, sales, and contract documents. While some automations of the real estate based automation package may be specific to tracking real estate properties, other automations of the same real estate based automation package may include communication based automations that enable a real estate agent to send automatic emails in response to inquiries. While an automation package may be manually selected, combined, or modified by a user, the plurality of automation packages presented for selection by a user may be based on the user's profile including information associated with user's vocation or profession so that a user may be presented with relevant automation packages for selection. For example, if the user is a Patent Attorney or an Intellectual Property Lawyer, the system may be configured to present one or more automation packages customized for attorneys, and more particularly, for patent attorneys, such as automations catered to track office actions and response deadlines upon receipt of an office action. In some embodiments, the user profile including information associated with, but not limited to, the name, age, gender, profession, educational qualification, location, contact information, employment records, and other credentials of the user may be pre-existing and already stored in a database. Additionally, or alternatively, the user may provide input or create a profile in response to a request from the system.

Figure 8:
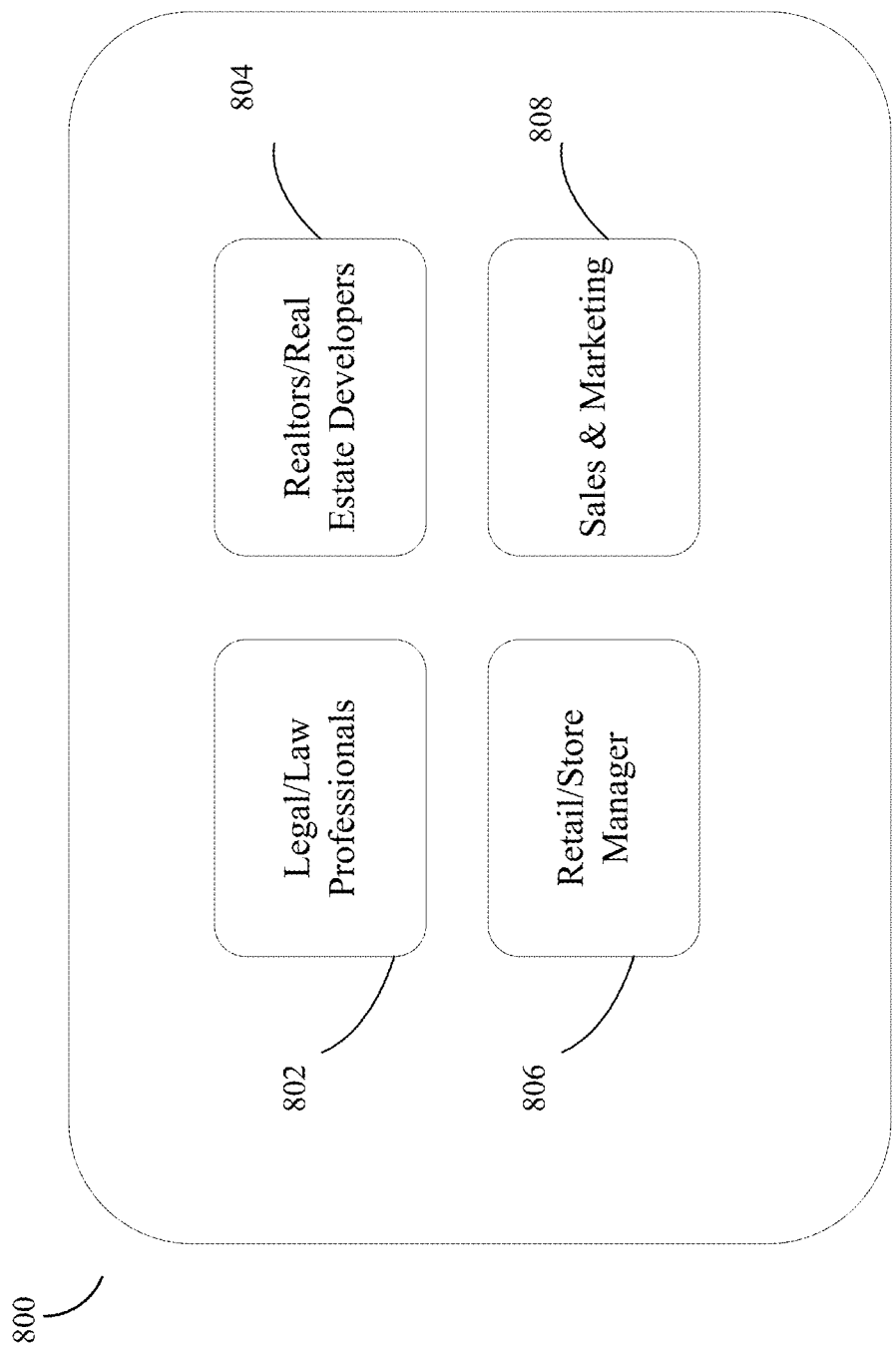
FIG. 8 illustrates an exemplary user interface displaying a plurality of automation packages, consistent with some embodiments of the present disclosure.

By way of example, FIG. 8 illustrates an exemplary user interface displaying a plurality of automation packages, consistent with some embodiments of the present disclosure. The user interface 802 may be configured to display or present a plurality of automation packages such as, for example, legal package 802, realtors' package 804, retail manager package 806, and sales & marketing package 808, customized for a particular profession, career, or a vocation. As illustrated, legal automation package 802 may include one or more automations customized for lawyers and legal professionals, automation package 804 may include one or more automations customized for realtors or real estate developers, automation package 806 may include one or more automations customized for retail store managers, and automation package 808 may include one or more automations customized for Sales & Marketing professionals. In some embodiments, the plurality of automation packages may be presented in a graphical format or in a pop-up menu, a drop-down list, a pick list, a tabulated list, or any suitable interface to allow a user to select the automation package based on their vocation. The one or more automation packages may be obtained from an automation marketplace such as a database configured to store automations, automation packages, and tables associated with the automations.

Consistent with some disclosed embodiments, at least one condition detected in the table may include a change in data in a cell of the table. As an example, in an automation "When a student is Status for school, send email to Personnel," the roll-call data table of students may be associated with the automation. Upon updating the table with the day's attendance, if a student is tardy for school, the data in a corresponding cell recording the attendance information for a student may change from a pre-existing value such as a blank or a null value, to presenting "Tardy." This change in data in a cell of the table may be detected which may trigger an action such as notifying "Personnel" (a defined condition for a specific individual) through an email or a phone call, or a text message, or any other means of communication.

Figure 9:
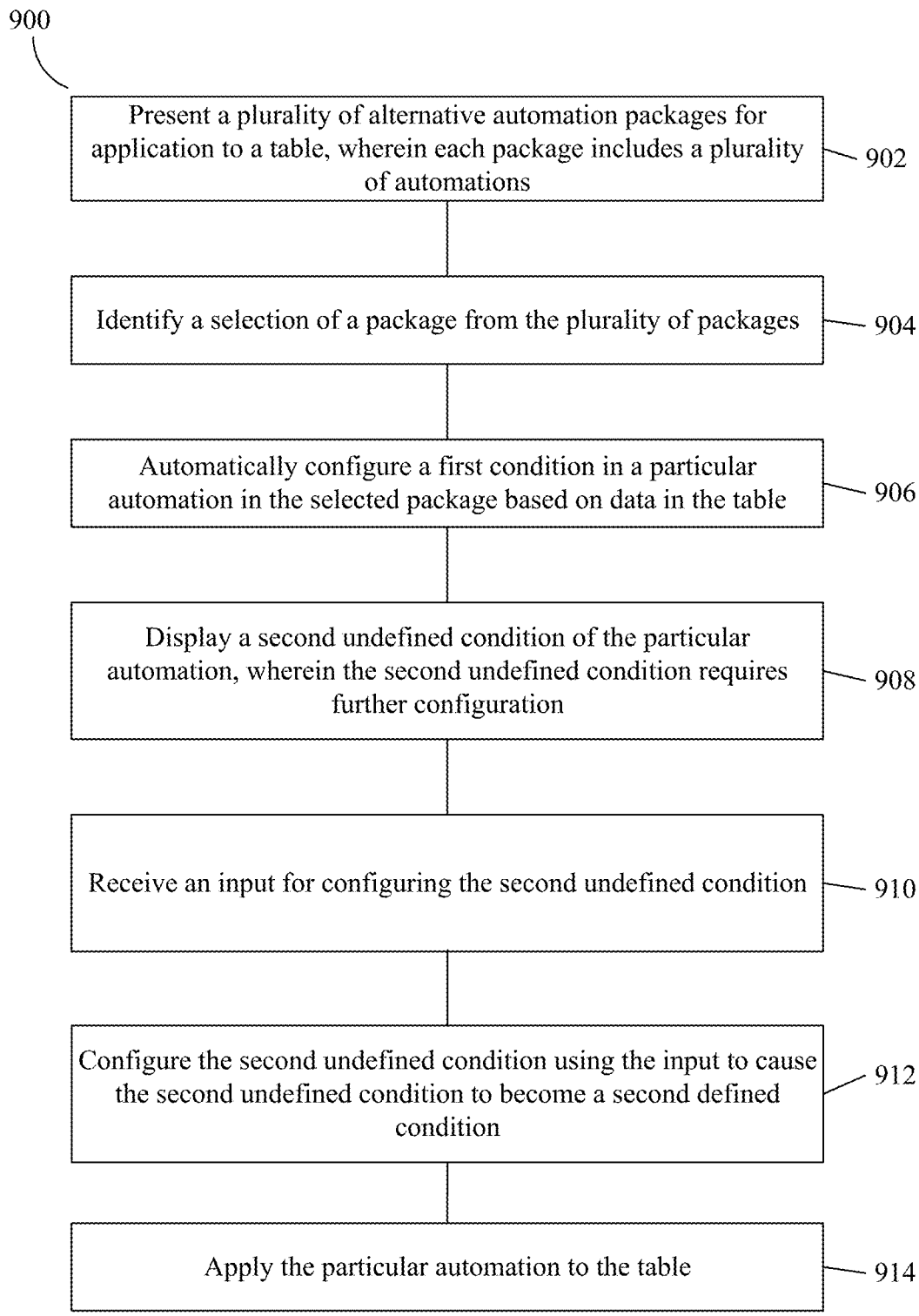
FIG. 9 is a block diagram for an exemplary process for employing self-configuring table automations, consistent with some embodiments of the present disclosure.

FIG. 9 depicts a block diagram of an exemplary process for employing self-configuring table automations, consistent with some disclosed embodiments. While the block diagram may be described below in connection with certain implementation embodiments presented in other figures, those implementations are provided for illustrative purposes only, and are not intended to serve as a limitation on the block diagram. In some embodiments, the process 900 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 7 to 9 by way of example. In some embodiments, some aspects of the process 900 may be implemented as software (e.g., program codes or instructions) that are stored in a memory (e.g., the memory portion 122 in FIG. 1) or a non-transitory computer-readable medium. In some embodiments, some aspects of the process 900 may be implemented as hardware (e.g., a specific-purpose circuit). In some embodiments, the process 900 may be implemented as a combination of software and hardware.

At block 902, processing circuitry 110 may present a plurality of alternative automation packages for application to a table, wherein each package may include a plurality of automations, and wherein each automation may be configured to cause an action in response to at least one condition detected in the table. As discussed in greater detail above, presenting a plurality of automation packages may include displaying a visual representation of automation packages, or displaying one or more automations associated with an automation package, or displaying automation packages in a pop-up menu, a drop-down list, a pick list, or any suitable interface to allow a user to select an automation package.

At block 904, processing circuitry 110 may identify a selection of a package from the plurality of packages. Identifying an automation package may occur in a computing device in response to a user selection of an automation package or an alternative automation package from a plurality of alternative automation packages.

At block 906, processing circuitry 110 may be configured to automatically configure a first condition in a particular automation in the selected package based on data in the table. Automatically configuring a condition based on data in the table may include mapping column heading information in the table to column heading information in the particular automation. Mapping may refer to linking or associating or establishing a relationship or a connection between two things (e.g., objects, data, interfaces, tables, and more).

At block 908, processing circuitry 110 may display an undefined condition in an automation may refer to presenting the condition to the user in an interactive format. Displaying an undefined condition in an automation may refer to presenting the condition to the user in an interactive format.

At block 910, processing circuitry 110 may receive an input for configuring the second undefined condition. An input may be received via a user interface provided by the computing device. For configuring the second undefined condition, the user interface may enable the user to select a column, a column heading, a row, or any cell of a table associated with the automation.

At block 912, processing circuitry 110 may configure the second undefined condition using the input to cause the second undefined condition to become a second defined condition. Configuring the second undefined condition may involve enabling input options for the user-definable requirements into the selected automation. An input for a user-definable requirement may refer to any data, information, or indication to be used for configuring the user-definable condition.

At block 914, processing circuitry 110 may apply the particular automation to the table. The automation may be applied to a specific table or a group of tables associated with the selected automation package. In some embodiments, the application of the particular automation may be activated and/or deactivated based on a user input.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

maintaining a first table with rows and columns defining first cells;

maintaining a second table with rows and columns defining second cells;

displaying a joint logical sentence structure template including a first definable condition and a second definable condition;

linking input options for the first definable condition to the first table;

linking input options for the second definable condition to the second table;

generating a joint rule for the first table and the second table by storing a first value for the first definable condition and storing a second value for the second definable condition;

applying the joint rule across the first table and the second table;

triggering the joint rule when the first condition in the first table is met and the second condition in the second table is met.

wherein the joint rule includes an outcome of altering at least one of the first table, the second table, or a third table as a result of the triggering;

wherein the joint rule includes an outcome of sending a notification as a result of the triggering;

wherein the joint rule includes activating a control for an external device, as a result of the triggering;

wherein linking input options for the first definable condition to the first table includes selecting as a default a current table being accessed by an entity;

wherein linking input options for the second definable condition to the second table includes linking the second table to the first table via the joint rule;

employing the joint rule to alter information in at least one of the first cells based on information in at least one of the second cells;

presenting a plurality of alternative automation packages for application to a table;

wherein each package includes a plurality of automations;

wherein each automation is configured to cause an action in response to at least one condition detected in the table;
identifying a selection of a package from the plurality of packages;
automatically configuring a first condition in a particular automation in the selected package based on data in the table;
displaying a second undefined condition of the particular automation;
wherein the second undefined condition requires further configuration;
receiving an input for configuring the second undefined condition;
configuring the second undefined condition using the input to cause the second undefined condition to become a second defined condition;
applying the particular automation to the table;
wherein the alternative automation packages are vocationally-based;
wherein each automation includes a logical sentence structure including definable conditions;
wherein the action includes at least one of a change in data in the table or in another table, or a change in control of an external device;
wherein at least one condition detected in the table includes a change in data in a cell of the table;
wherein automatically configuring based on data in the table includes mapping column heading information in the table to column heading information in the particular automation;
wherein the mapping occurs using artificial intelligence;
wherein the mapping occurs using linguistic processing; and
wherein displaying the second undefined condition includes presenting a logical sentence structure with a variable field for subsequent completion.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for implementing multi-table automation triggers, the system comprising:
at least one processor configured to:
maintain a first table with rows and columns defining first cells;
maintain a second table with rows and columns defining second cells;
display a joint logical sentence structure template including a first definable condition and a second definable condition;
link input options for the first definable condition to the first table;
link input options for the second definable condition to the second table;
generate a joint rule for the first table and the second table by storing a first value for the first definable condition and storing a second value for the second definable condition, wherein linking input options for the second definable condition to the second table includes linking the second table to the first table via the joint rule such that data in the first table and data in the second table are duplicated;
apply the joint rule across the first table and the second table; and
trigger the joint rule when the first condition in the first table is met and the second condition in the second table is met, wherein the joint rule is further configured to alter a third table in response to the triggering of the joint rule, and wherein the alteration of the third table includes an indication that the first condition in the first table is met and the second condition in the second table is met.

2. The system of claim 1, wherein the joint rule includes an outcome of sending a notification as a result of the triggering.

3. The system of claim 1, wherein the joint rule includes activating a control for an external device, as a result of the triggering.

4. The system of claim 1, wherein linking input options for the first definable condition to the first table includes selecting as a default a current table being accessed by an entity.

5. The system of claim 1, wherein the at least one processor is further configured to employ the joint rule to alter information in at least one of the first cells based on information in at least one of the second cells.

6. A non-transitory computer readable medium containing instructions that when executed by at least one processor, cause the at least one processor to perform operations for implementing multi-table automation triggers, the operations comprising:
maintaining a first table with rows and columns defining first cells;
maintaining a second table with rows and columns defining second cells;
displaying a joint logical sentence structure template including a first definable condition and a second definable condition;
linking input options for the first definable condition to the first table;
linking input options for the second definable condition to the second table;
generating a joint rule for the first table and the second table by storing a first value for the first definable condition and storing a second value for the second definable condition, wherein linking input options for the second definable condition to the second table includes linking the second table to the first table via the joint rule such that data in the first table and data in the second table are duplicated;
applying the joint rule across the first table and the second table; and
triggering the joint rule when the first condition in the first table is met and the second condition in the second table is met, wherein the joint rule is further configured to alter a third table in response to the triggering of the joint rule, and wherein the alteration of the third table includes an indication that the first condition in the first table is met and the second condition in the second table is met.

7. The non-transitory computer readable medium of claim 6, wherein the joint rule includes an outcome of sending a notification as a result of the triggering.

8. The non-transitory computer readable medium of claim 6, wherein the joint rule includes activating a control for an external device as a result of the triggering.

9. The non-transitory computer readable medium of claim 6, wherein linking input options for the first definable condition to the first table includes selecting as a default a current table being accessed by an entity.

10. The non-transitory computer readable medium of claim 6, wherein the operations further comprise employing the joint rule to alter information in at least one of the first cells based on information in at least one of the second cells.

11. A method for implementing multi-table automation triggers, the method comprising:
maintaining a first table with rows and columns defining first cells;
maintaining a second table with rows and columns defining second cells;
displaying a joint logical sentence structure template including a first definable condition and a second definable condition;
linking input options for the first definable condition to the first table;
linking input options for the second definable condition to the second table;
generating a joint rule for the first table and the second table by storing a first value for the first definable condition and storing a second value for the second definable condition, wherein linking input options for the second definable condition to the second table includes linking the second table to the first table via the joint rule such that data in the first table and data in the second table are duplicated;
applying the joint rule across the first table and the second table; and
triggering the joint rule when the first condition in the first table is met and the second condition in the second table is met, wherein the joint rule is further configured to alter a third table in response to the triggering of the joint rule, and wherein the alteration of the third table includes an indication that the first condition in the first table is met and the second condition in the second table is met.

12. The method of claim 11, wherein the joint rule includes an outcome of sending a notification as a result of the triggering.

13. The method of claim 11, wherein the joint rule includes activating a control for an external device as a result of the triggering.

14. The method of claim 11, further comprising employing the joint rule to alter information in at least one of the first cells based on information in at least one of the second cells.

15. The system of claim 1, wherein duplicating data in the first table and data in the second table includes linking input options for the first definable condition to the second table in addition to the first table.

16. The system of claim 1, wherein duplicating data in the first table and data in the second table includes linking input options for the second definable condition to the first table in addition to the second table.

* * * * *